US012739276B1

(12) United States Patent
Bruins

(10) Patent No.: US 12,739,276 B1
(45) Date of Patent: Sep. 15, 2026

(54) SECURITY ALERT CUSTOMIZATION USING LOCAL COMPUTE ENVIRONMENT CHARACTERISTICS

(71) Applicant: Rapid7, Inc., Boston, MA (US)

(72) Inventor: Jeffrey Bruins, Reston, VA (US)

(73) Assignee: Rapid7, Inc., Boston, MA (US)

( * ) Notice: Subject to any disclaimer, the term of this patent is extended or adjusted under 35 U.S.C. 154(b) by 0 days.

(21) Appl. No.: 18/804,176

(22) Filed: Aug. 14, 2024

(51) Int. Cl.
*H04L 9/40* (2022.01)

(52) U.S. Cl.
CPC ...... *H04L 63/1441* (2013.01); *H04L 63/1416* (2013.01)

(58) Field of Classification Search
None
See application file for complete search history.

(56) References Cited

U.S. PATENT DOCUMENTS

| | | | | |
|---|---|---|---|---|
| 8,468,599 | B2 | 6/2013 | McCusker et al. | |
| 9,646,228 | B2 | 5/2017 | Appel et al. | |
| 9,876,815 | B2 | 1/2018 | Sultan et al. | |
| 10,027,711 | B2 | 7/2018 | Gill et al. | |
| 10,178,109 | B1 * | 1/2019 | Miskovic | H04L 63/1416 |
| 10,250,619 | B1 | 4/2019 | Park et al. | |
| 10,805,326 | B1 | 10/2020 | Wang et al. | |
| 10,862,914 | B1 | 12/2020 | Mezic et al. | |
| 10,873,596 | B1 * | 12/2020 | Bourget | H04L 51/02 |
| 11,411,966 | B2 | 8/2022 | Muddu et al. | |
| 11,876,809 | B2 | 1/2024 | Merza | |
| 11,902,120 | B2 | 2/2024 | Prasad et al. | |
| 11,956,253 | B1 * | 4/2024 | Lin | G06N 7/01 |
| 11,962,622 | B2 | 4/2024 | Kung et al. | |
| 12,301,614 | B1 * | 5/2025 | Payne | H04L 63/1491 |
| 12,341,797 | B1 * | 6/2025 | Adamson | H04L 63/1425 |
| 2003/0172167 | A1 * | 9/2003 | Judge | H04L 63/0236 709/229 |
| 2008/0189788 | A1 * | 8/2008 | Bahl | H04L 63/1416 726/25 |
| 2009/0254970 | A1 * | 10/2009 | Agarwal | G06F 21/554 726/1 |
| 2011/0078497 | A1 * | 3/2011 | Lyne | G06F 11/1469 714/15 |
| 2012/0216243 | A1 * | 8/2012 | Gill | G06F 21/55 726/1 |
| 2014/0090056 | A1 * | 3/2014 | Manadhata | H04L 63/1416 726/22 |
| 2014/0325643 | A1 * | 10/2014 | Bart | H04L 63/1425 726/22 |

(Continued)

*Primary Examiner* — Teshome Hailu
*Assistant Examiner* — Mahabub S Ahmed
(74) *Attorney, Agent, or Firm* — Ashwin Anand

(57) ABSTRACT

Various embodiments include systems and methods pertaining to a security service platform that detects security threats based on results from multiple security systems. The multiple security systems may each generate and store respective security alerts within a priority object. The priority object may be used to define rules that are based on results from the multiple security systems, including determining groups of security alerts or determining security alert prioritization based on local compute environment characteristics. The security service platform may use the grouping and prioritization information to provide remediation for an alert that indicates a detected cyberattack.

14 Claims, 10 Drawing Sheets

(56) References Cited

U.S. PATENT DOCUMENTS

| | | | | |
|---|---|---|---|---|
| 2015/0271201 | A1* | 9/2015 | Ruvio | H04L 67/12 726/23 |
| 2016/0173513 | A1* | 6/2016 | Rohde | H04L 63/126 726/23 |
| 2016/0301704 | A1* | 10/2016 | Hassanzadeh | G06F 21/64 |
| 2017/0230410 | A1* | 8/2017 | Hassanzadeh | G06N 20/00 |
| 2018/0152471 | A1* | 5/2018 | Jakobsson | H04L 63/1433 |
| 2018/0227322 | A1* | 8/2018 | Luo | H04L 63/1425 |
| 2018/0247483 | A1 | 8/2018 | Lindsay | |
| 2019/0306011 | A1* | 10/2019 | Fenoglio | H04L 41/142 |
| 2019/0379683 | A1* | 12/2019 | Overby | G06F 9/45533 |
| 2019/0379700 | A1* | 12/2019 | Canzanese, Jr. | G06F 16/9024 |
| 2020/0105123 | A1 | 4/2020 | Davies et al. | |
| 2020/0236122 | A1* | 7/2020 | Ott | H04L 63/1408 |
| 2020/0285737 | A1* | 9/2020 | Kraus | G06F 21/552 |
| 2020/0336506 | A1* | 10/2020 | Levin | H04L 63/1425 |
| 2021/0067442 | A1* | 3/2021 | Sundararajan | H04L 45/04 |
| 2021/0126938 | A1* | 4/2021 | Trost | G06F 21/552 |
| 2021/0203673 | A1* | 7/2021 | dos Santos | H04L 63/1408 |
| 2021/0211452 | A1* | 7/2021 | Patel | H04L 63/1416 |
| 2021/0349994 | A1* | 11/2021 | Ravindra | G06F 21/554 |
| 2022/0222350 | A1* | 7/2022 | Franzen | G06F 11/321 |
| 2022/0318625 | A1* | 10/2022 | O'Toole | G06N 3/08 |
| 2022/0342988 | A1* | 10/2022 | Brunza | H04L 63/1408 |
| 2023/0064153 | A1* | 3/2023 | Kulandaivel | G07C 5/0816 |
| 2023/0216869 | A1* | 7/2023 | Howard | H04L 63/102 726/23 |
| 2023/0275912 | A1* | 8/2023 | Shahul | H04L 41/16 726/23 |
| 2023/0336586 | A1* | 10/2023 | Sopan | H04L 63/1433 |
| 2023/0362184 | A1* | 11/2023 | Gelman | H04L 63/1433 |
| 2023/0396638 | A1* | 12/2023 | Hebbagodi | H04L 63/20 |
| 2024/0056462 | A1* | 2/2024 | Hathaway | H04L 51/212 |
| 2024/0297904 | A1* | 9/2024 | Bertiger | H04L 63/1425 |
| 2024/0356943 | A1* | 10/2024 | Kopp | H04L 63/20 |
| 2024/0362461 | A1* | 10/2024 | Jain | G06N 3/088 |
| 2024/0430285 | A1* | 12/2024 | Almadi | H04L 63/1433 |
| 2025/0047693 | A1* | 2/2025 | Kolosnjaji | H04L 63/1425 |
| 2025/0088517 | A1* | 3/2025 | Davraev | H04L 63/14 |
| 2025/0097253 | A1* | 3/2025 | Huang | H04L 41/16 |
| 2025/0131084 | A1* | 4/2025 | Mo | G06F 21/577 |
| 2025/0133093 | A1* | 4/2025 | Oliver | G06N 5/022 |
| 2025/0141896 | A1* | 5/2025 | Thomas | H04L 63/1425 |
| 2025/0173434 | A1* | 5/2025 | Yaron | G06F 21/554 |
| 2025/0254208 | A1* | 8/2025 | Rose | H04L 63/0236 |
| 2025/0280067 | A1* | 9/2025 | Phatak | H04L 63/1433 |

* cited by examiner

Telemetry Data
152

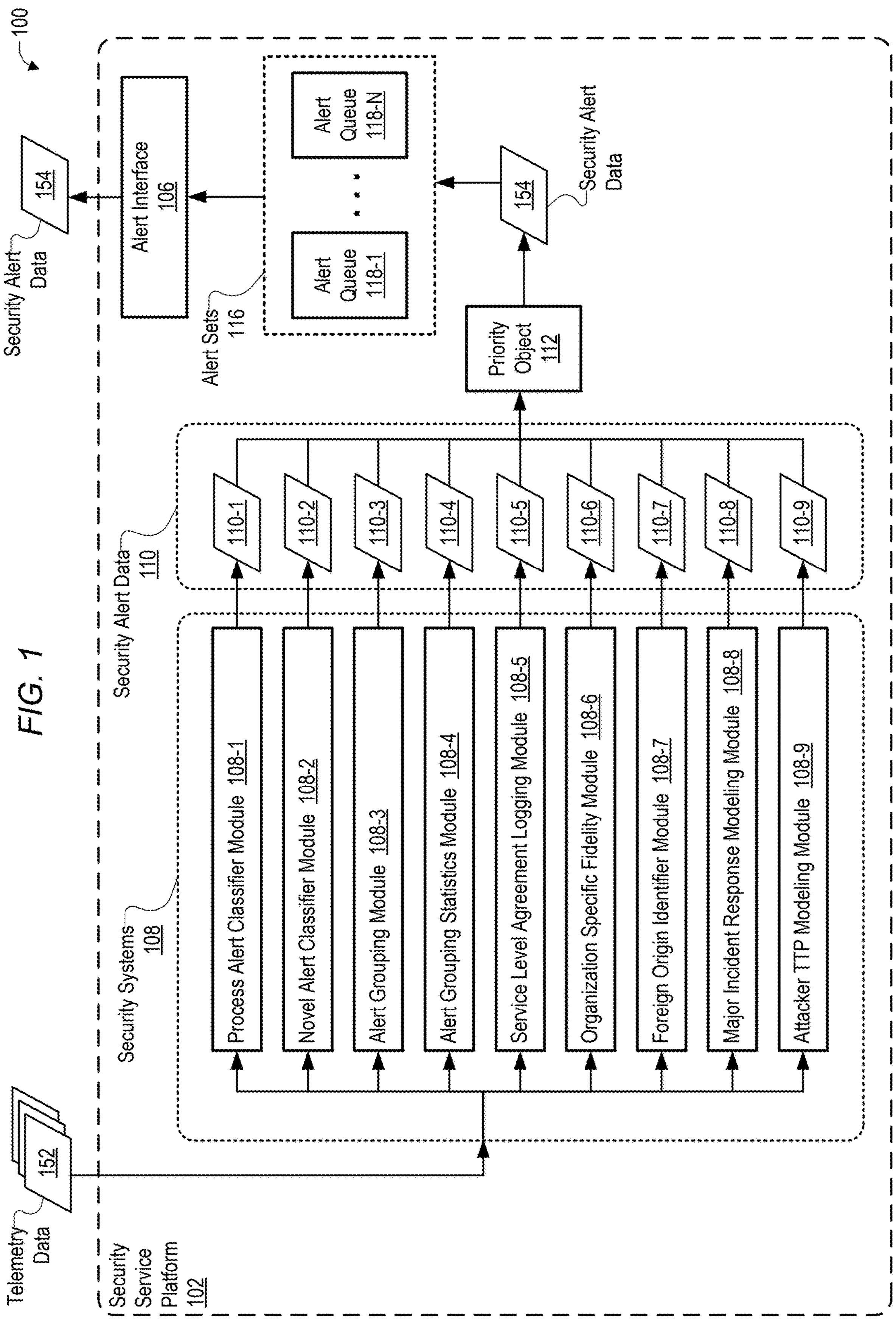

FIG. 1
Security Alert Data
154
100
Security Service Platform 102
Security Systems 108
Security Alert Data 110
Alert Interface 106
Alert Sets 116
Process Alert Classifier Module 108-1
Novel Alert Classifier Module 108-2
Alert Grouping Module 108-3
Alert Grouping Statistics Module 108-4
Service Level Agreement Logging Module 108-5
Organization Specific Fidelity Module 108-6
Foreign Origin Identifier Module 108-7
Major Incident Response Modeling Module 108-8
Attacker TTP Modeling Module 108-9
110-1
110-2
110-3
110-4
110-5
110-6
110-7
110-8
110-9
Alert Queue 118-1
Alert Queue 118-N
Priority Object 112
154
Security Alert Data

400

Security System Schema 452

Key Value 450

```
"PriorityObject": {
        "process_alert_classifier": { },
        "novel_alert_classifier": { },
        "alert_grouping": { },
        "alert_grouping_statistics": { },
        "service_level_agreement_logging": { },
        "organization_specific_fidelity": { },
        "foreign_origin_identifier": { },
        "major_incident_response_modeling": { },
        "attacker_ttp_modeling": {
                "owner": "<owner>",
                "owner_contact": "<contact information>",
                "notable": null | true | false,
                "priority": null | 0-5 (int? float?),
                "confidence_rating": null | float,
                "predicted_disposition": {
                        "Benign": float,
                        "Malicious": float
                },
                "description": "<what was determined for this security alert>",
                "metadata": null | {"<arbitrary key>": "<arbitrary value>"},
                "notes": "<what did this security system do?>",
                "last_modified": null | "YYYY-MM-DD hh:mm:ss"
        }
}
```

*FIG. 4B*

Determine, by a first security system processing first telemetry data associated with a first compute environment, first security alert data comprising a first one or more characteristics.
602

Determine, by the first security system processing the first telemetry data, first prioritization data associated with the first security alert data.
604

Determine, by a second security system processing second telemetry data associated with the first compute environment, second security alert data comprising a second one or more characteristics.
606

Determine, by the second security system processing the second telemetry data, second prioritization data associated with the second security alert data.
608

Determine, based on the first security alert data and on the second security alert data, third security alert data comprising the first one or more characteristics, the first prioritization data, the second one or more characteristics, and the second prioritization data.
610

Initiate, based on determining the third security alert data, one or more remediation operations.
612

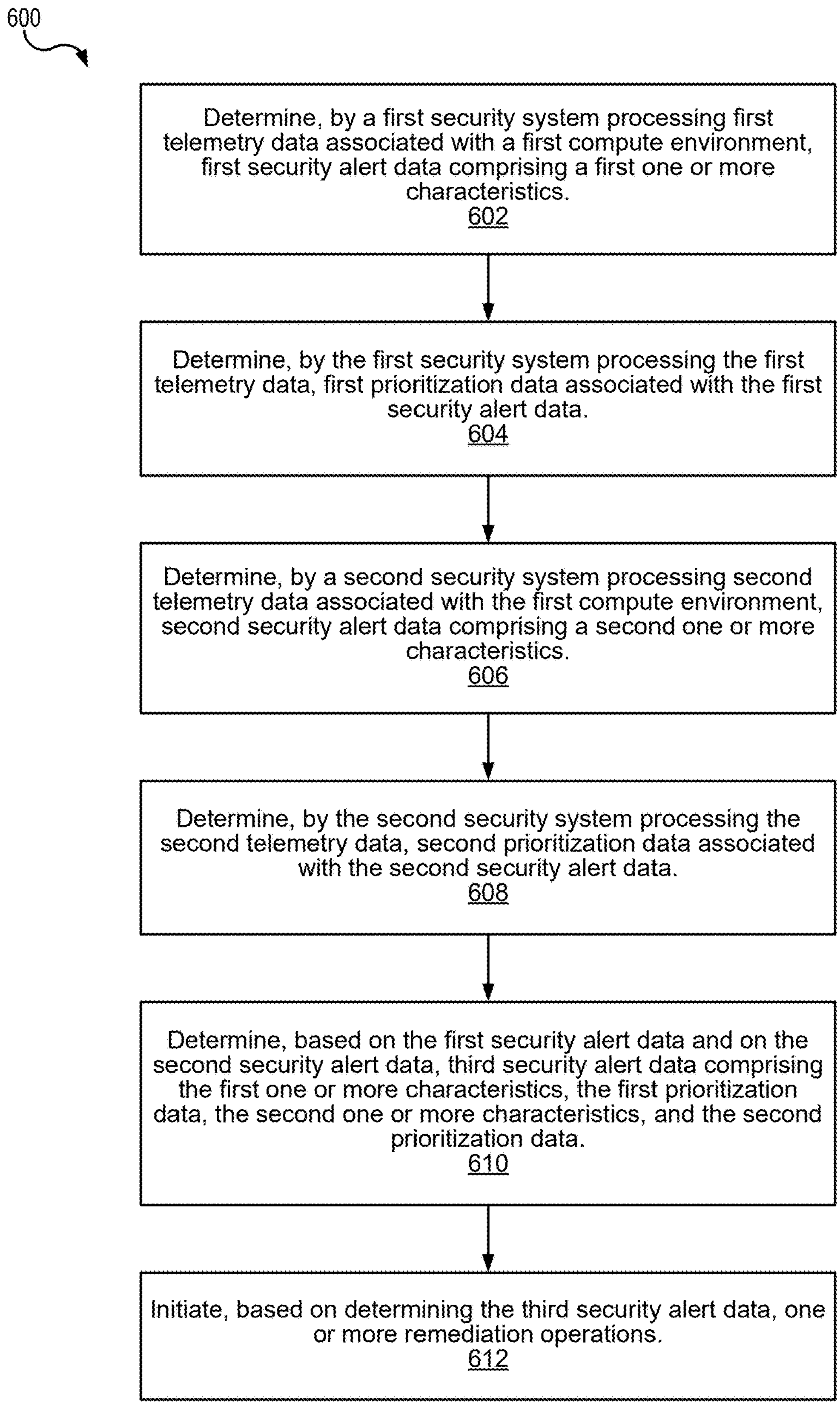

*FIG. 6*

SECURITY ALERT CUSTOMIZATION USING LOCAL COMPUTE ENVIRONMENT CHARACTERISTICS

BACKGROUND

Many companies operate computer environments that are connected to public networks such as the internet. While such connections allow users to access resources on public networks, they also expose a company network to cyberattacks. Cyberattacks may obtain sensitive information, gain control of the company's computing systems, or damage company resources. To prevent cyberattacks, security management systems have become increasingly important to protect private company networks against these types of vulnerabilities.

BRIEF DESCRIPTION OF THE DRAWINGS

FIG. 1 is a block diagram illustrating an example security service platform that includes multiple security systems, in accordance with some embodiments.

FIG. 4B is a block diagram depicting data formats of a priority object used by the security service platform, in accordance with some embodiments.

FIG. 6 is a flowchart that illustrates an example of the security service platform, in accordance with some embodiments.

Figure 2:
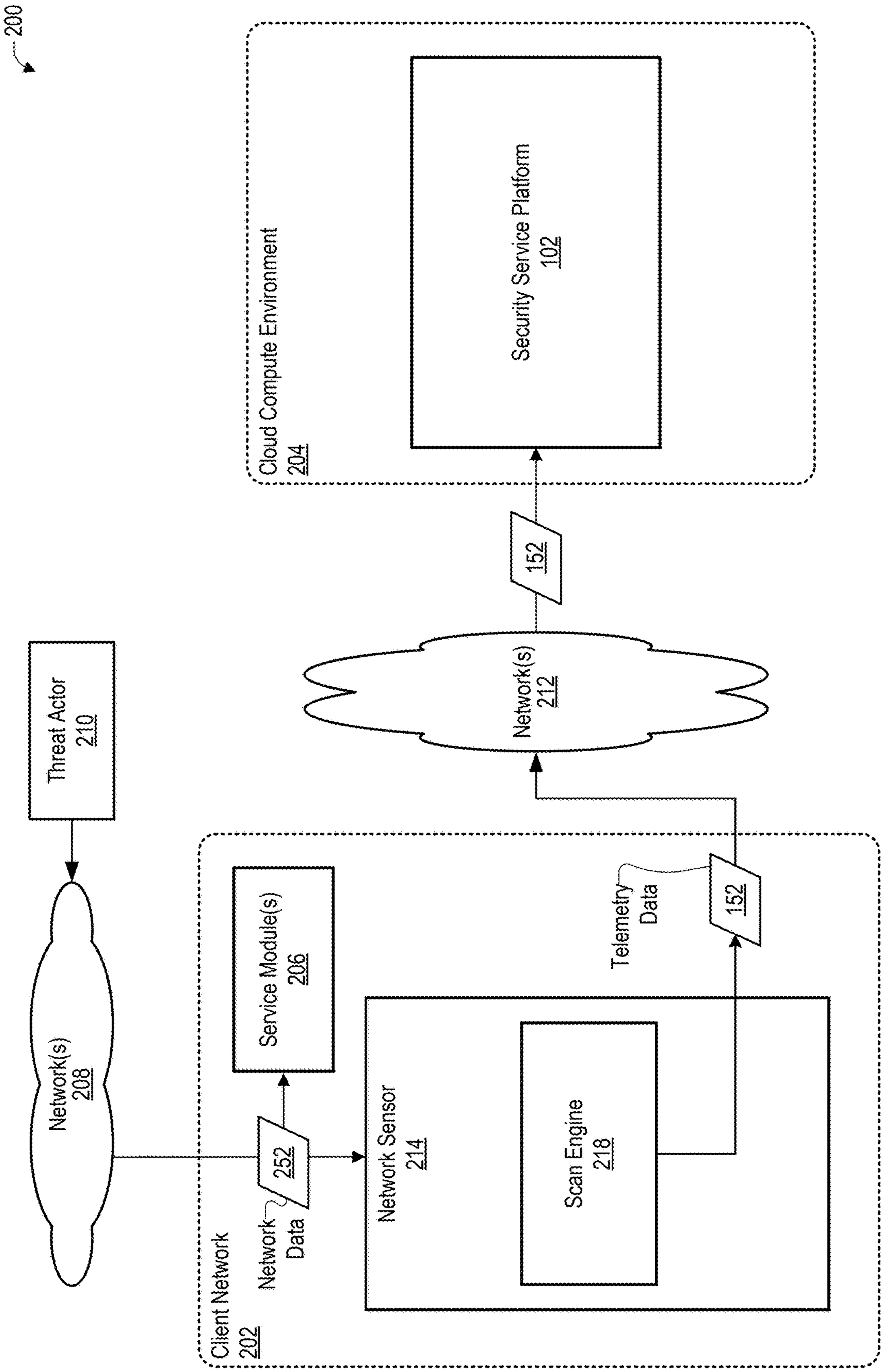
FIG. 2 is a block diagram illustrating an example system architecture for the security service platform, in accordance with some embodiments.

While embodiments are described herein by way of example for several embodiments and illustrative drawings, those skilled in the art will recognize that embodiments are not limited to the embodiments or drawings described. It should be understood that the drawings and detailed description are not intended to limit embodiments to the particular form disclosed, but on the contrary, the intention is to cover all modifications, equivalents and alternatives falling within the spirit and scope as defined by the appended claims. As used throughout this disclosure, the word "may" is used in a permissive sense (i.e., meaning "having the potential to"), rather than the mandatory sense (i.e., meaning "must"). Similarly, the words "include," "including," and "includes" mean "including, but not limited to".

DETAILED DESCRIPTION OF EMBODIMENTS

As disclosed, a security service platform analyzes security alert data to detect threats to a computer network or computer system. The enormity of the amount of security alert data to be analyzed during operation of a client service or operation makes it difficult for each security alert associated with security alert data to be quickly analyzed to determine whether to initiate remediation measures. The disclosed security service platform may determine multiple dimensions of threat detection data that may be associated with a single instance of security alert data to customize security alert data such that the associated security alert may be resolved quickly and accurately.

An individual dimension of threat detection data may be determined based on a threat detection analysis performed by an individual threat detection system. The security service platform may, based on the multiple dimensions of threat detection data, determine an appropriate channel for further analysis of an instance of security alert data.

In some implementations, a single instance of security alert data may include metadata indicative of the multiple dimensions of threat detection data performed by multiple threat detection systems. A single instance of security alert data may include metadata indicative of multiple dimensions of threat detection data performed by a single threat detection system performing different types of threat assessments or analyzing different types of network events or assets.

In some implementations, based on multiple threat detection systems determining security alert data, and based on the security service platform preserving individual results from the multiple threat detection systems, the security service platform may provide a queue of security alert data that may be sorted according to the multiple dimensions of threat detection data. Such sorting may allow for quicker analysis of security alert data, which may have the technical advantage of faster threat detection times and more accurate detection rates.

In traditional systems, priority criteria for security alerts may follow a standard model, where a security alert may be rated from low to critical. However, some users may have compute environments that exist outside of a baseline environment used to determine a security alert rating. For example, a first security alert for a baseline environment may be classified as high, where for a specific customer environment, the first security alert may be classified as low.

In traditional systems, conversely, a second security alert for the baseline environment may be classified as low, where for the specific customer environment, the second security alert may be classified as high. Among other technical benefits, such a discrepancy between classifications of a security alert may be avoided with the disclosed security service platform.

As disclosed, a security services platform may, based on the multiple dimensions of threat detection data, direct or route a security alert to one or more analysis queues. A given analysis queue may be associated with an automated system that validates whether or not to initiate remediation actions in response to a given security alert. A respective analysis queue may also be monitored by a respective security analyst with respective: expertise on a particular type of compute environment, expertise with a particular type of security threat, expertise with a particular type of asset, and/or expertise with a particular type of threat activity.

In some implementations, the security services platform may determine a priority level for a security alert based on factors in addition to, or instead of, the multiple dimensions of threat detection data. For example, the security services platform may determine of a priority level for a security alert based at least on whether or not resolution or delay in responding to a security alert may affect a service level agreement (SLA) for security services by the security services platform being provided for a compute environment.

In some implementations, the security services platform may determine a priority level, an analysis queue, or both a priority level and analysis queue, based on whether a security alert includes characteristics of a cyberattack that are uncommon or complex. For example, characteristics of a cyberattack may be determined to be uncommon based on one or more of the characteristics of the cyberattack occurring below a threshold percentage occurrences.

In some implementations, the threshold percentage of occurrences may be based on occurrences of a security event, or characteristics of a security event, at a specific compute environment, or among multiple compute environments. Characteristics of a cyberattack may be determined to be complex based on a quantity of characteristics of the cyberattack being greater than a threshold quantity of cyberattack characteristics.

In some implementations, the security service platform may determine that a security alert is part of a cluster of diverse security alerts associated with a given asset or with a given user account or profile. For example, if a given asset is a target of multiple types of cyberattacks, then multiple security alerts may be determined by one or more threat detection systems. Individually, security alerts in a cluster of security alerts may be classified as low or medium security alerts, which may result in a delay in further analysis or remediation actions.

However, continuing with this implementation, if the security alerts in a cluster of security alerts are determined to be part of a cluster of security alerts, then the security service platform may determine to raise a priority level associated with one or more of the cluster of security alerts, or to generate a cluster of security alerts with a higher priority level than any individual one of the cluster of security alerts.

In some implementations, an additional technical benefit of the security service platform may be improving the accuracy in detecting true security threats. Such an improvement in detection accuracy may be considered an improvement in quality assurance, or an improved "safety net". In a compute environment, security alerts may be detected based on factors that are ultimately not threats to the compute environment, or that ultimately are a source of tolerable risks. A technical advantage of the security service platform improving detection accuracy for security alerts may be quicker detection of harmful cyberattacks, which may result in improved security of compute assets.

In some implementations, the manner in which a security service platform reduces the risk of a false detection may be determined based on a combination of determining a priority level for a security alert and determining an analysis queue from among a plurality of analysis queues. For example, the security service platform may use statistics determined from the prioritization method described above to determine specific security alerts as true positive detections of malicious activity. In some examples, to determine specific alerts as true positive detections, the security service platform may determine that a likelihood of a specific alert being a true positive detection is greater than a confidence threshold.

Continuing this example implementation, the security service platform may, based on the specific alerts determined to be likely true positive detections, determine other security alerts based on a comparison of the other security alerts to the specific alerts determined to be likely true positive detections. In some examples, the other security alerts may have been determined, by a security analyst or another security system, to not be a true positive detection.

In some implementations, the security service platform may comprise a process alert classifier. A process alert classifier may be implemented as a machine learning system. In some examples, for a security alert triggered by one or more actions of one or more executable applications or processes, the process alert classifier may use a machine learning model to determine whether contents of security alert data are indicative of a security threat. The process alert classifier, based on determining that contents of the security alert data are indicative of a security threat, may determine one or more remedial responses to the security alert data being indicative of a security threat.

Continuing this implementation, the process alert classifier may implement a first one or more machine learning models that have been trained on datasets from a plurality of compute environments. The datasets from the plurality of compute environments may include true detections of security threats that are true across multiple types of compute environments. The first one or more machine learning models may determine a security alert based on whether telemetry data input generates an output indicative of a security alert.

Continuing this implementation, the process alert classifier may implement a second one or more machine learning models that have been trained on datasets from a specific compute environment, such as client network. The datasets from the specific compute environment may include true detections of security threats that are true within the scope of the specific compute environment.

Further in example, the process alert classifier may, based on the first one or more machine learning models using first telemetry data, determine first security alert data and first prioritization data associated with the first security alert data. The process alert classifier may, based on the second one or more machine learning models using the first telemetry data, determine second security alert data and second prioritization data associated with the second security alert data.

Continuing this example, the second prioritization data may indicate a higher priority level than the priority level indicated by the first prioritization data. The higher priority level indicated by the second prioritization data may be based on the process alert classifier having more accurate detection rates based on using machine learning models that are more specific to a given compute environment.

Concluding this example, the security service platform may reprioritize the prioritization value of a security alert based on the same telemetry data to give greater weight to the classification, or determination of a security value, that is based on a single compute network from which the telemetry data is determined.

In some implementations, similar to use of multiple determinations of security alerts based on the same telemetry data, the other security systems implemented by the security service platform may re-prioritize a security alert based on a comparison between classifiers tuned to a specific compute environment and classifiers tuned based on multiple compute environments.

In some implementations, based on a security alert being reprioritized based on security system classification based on using individual characteristics, or characteristics of a compute environment associated with the compute environment from which the telemetry data is determined, the security alert data may be routed to a specific alert queue. For example, different alert queues may be associated with different types of analysts having different skills.

In some implementations, some alert queues may be associated with analysts with greater experience in a specific type of compute environment. In some examples, if a security alert is reprioritized to have a higher priority level based on comparison between individual and global security alert determinations, then the security alert may be routed, or transmitted, to an alert queue associated with specialists in a type of compute environment similar to the individual compute environment.

In some examples, the one or more remedial responses may be historical remedial responses typically undertaken in response to the security alert data being indicative of a security threat. Historical remedial actions may be tracked and recorded as the security service platform operates within a compute environment.

In some implementations, the security service platform may comprise a novel alert classifier. A novel alert classifier may determine whether security alerts classified as given priority have been triggered, or identified, by a detection rule that has also triggered any other security alerts within a time threshold. In some examples, a time threshold may be arbitrarily set, such as several hours, one or more weeks, or one or more months.

Continuing this implementation, in some examples, a given priority may be "low", "medium", or more than priority level, where the priority level is different from a highest, or most urgent, priority level associated with a given compute environment. In some examples, the time threshold may be based on historical security alert statistics for identifying novel alerts with respect to true positive detection ratios.

In some examples, the novel alert classifier may determine a data point to each given security alert that represents an amount of time since a previous instance of the given security alert associated with a detection rule within a given compute environment. Based on the data points, multiple security alerts may be sorted based on frequency of occurrence within a compute environment.

Continuing this implementations, accuracy of detection of true security alerts of the novel alert classifier may be based at least in part on a novelty characteristics of a security alert. In some examples, a novelty alert characteristic may be described by detection rules that fire less frequently doing so based on normal, or non-threatening, activity in a given compute environment not triggering false positive security alerts. Consequently, in this example, a security alert that fires, or is detected, is more likely to be a true positive security alert detection relative to not basing detection on the novelty characteristics of a security alert.

In some implementations, the security service platform may comprise an alert grouping system. The alert grouping system may use multiple data points as a basis for determining a security event. A first example data point, where a data point may be indicative of a threat detection, may be a window of time during which telemetry data may be used to determine a security event. A second example of a data point may be a quantity of detection rules that are triggered per a given asset, or type of asset. A third example of a data point may be a quantity of detection rules that are triggered per a given account, such as a user account, administrator account, or other type of account or entity profile.

Continuing this example, the alert grouping system may determine a detection of a security event, and associated security event data, based on one or more rules using one or more of the points of detection. For example, the alert grouping system may determine a security event based on a rule indicating: first data point indicating a two-hour window of time, a second data point indicating greater than two (2) detection rules triggering per asset, and a third point of detecting indicating greater than three (3) detection rules triggering per account, where none of the security alerts for the points of detection have been determined to be resolved or being investigated. In this example, if the rule is matched, then the alert grouping system may determine detection of a security event and determine associated security event data.

Continuing this implementation, the alert grouping system may use a rule that represents a relationship between points of detection, where points of detection may be related, or linked. For example, a first data point may be an account, and a second data point may be an asset within a compute environment. In this example, an alert grouping may represent the relationship based on a rule that triggers when each of the points of detection that are grouped together are individually triggered.

In some implementations, a data point may be indicative of a number of different detection rules have been triggered for a given alert grouping. For example, if the data point indicative of a number of detection rules is greater than a detection number threshold, then the alert grouping system may determine a security event.

In this implementation, accuracy of a security event detection may be based on behavior of a typical cyberattack, where from a point of an initial attack within a compute environment, the greater the variety of actions, such as malicious activity, will be performed. In some examples, the variety of actions may be associated, such as a compromised account being used to perform a malicious action within the compute environment.

In some implementations, the alert grouping system may determine an alert grouping over an alert window that is specified in an amount of time, such as four (4) weeks. Over the specified alert window, the alert grouping system may recursively identify assets, accounts, or users associated with security alerts, and in turn, determine that the security alerts are within the alert window and determine additional assets, accounts, or users until no new information may be determined within the alert window.

Continuing this implementation, any resulting group of security alerts from the recursive identification may be used to determine information in an alerts database indicative of an alert grouping, a detection cluster, and/or whether an alert grouping has associated statistics. In some examples, statistics may be calculated based on historical detection clusters and outcomes over a period of time, such as 52 weeks, or some other period of time. Statistics may be determined as a percentage likelihood that an outcome is represented by at least one security alert within an alert cluster.

In some implementations, a security service platform may comprise an alert grouping statistics system. An alert grouping statistics system may, based on historical alert groupings within a specified period of time, determine a security event. For example, over a time period of, say, 12 months, the alert grouping statistics system may determine multiple alert groupings.

In this example, at least one alert grouping from among the multiple alert groupings may comprise at least one individual security alert that may have been determined to be a true positive detection of a security threat. A true positive may be determined using multiple techniques, including by a security system and/or by a security analyst.

Continuing this implementation, the alert grouping statistics system may determine multiple points of detection for each security alert that is part of a given alert grouping. In this example, the multiple points of detection may comprise information about the entire given alert grouping. In one example, an alert grouping may comprise X security alerts that have been triggered by Y different detection rules, where the security alerts may link, or correlate, Z different accounts and/or assets.

Continuing this example, if only a single one of the security alerts is a true positive detection of a security threat, then the detection rate being low becomes insignificant. Continuing this example, the alert grouping statistics system may determine, over a given time period, how common an alert grouping is. In this way, the alert grouping statistics system may determine security alert data that indicates how common an alert grouping may be.

In some implementations, the security service platform may comprise a service level agreement logging system. For example, for security alerts at ingestion time, the service level agreement logging system may log, for individual security alerts, or for alert groupings, a time at which the security alert will exceed a contractual service level agreement (SLA). Continuing this example, based on whether a given security alert is within a threshold amount of time to exceeding an SLA, the service level agreement logging system may generate a notification for the given security alert to be analyzed.

In some implementations, the security service platform may comprise an organization specific fidelity system. An organization specific fidelity system may use historical statistics for a detection rule that triggered a security alert to determine a data point which may represent the detection rules statistics for a specific customer as compared to an overall detection rate. An overall detection rate may be a detection rate descriptive of a detection percentage, or ratio, for multiple compute environments.

Continuing this example, for many compute environments, when a security alert is triggered, a historical detection rate for an associated detection rule may be either above or below global statistics. In some examples, global statistics may be statistics for the detection rule across multiple compute environments. Consequently, the security service platform may sort multiple security alerts based on which security alerts are most likely to deviate from global detection rates. In some examples, global detection rates may be detection rates across multiple compute environments. A technical advantage of using the organization specific fidelity system is that given the sorted security alerts, incident response times for a compute environment may be reduced.

In some implementations, the security service platform may comprise a foreign origin identifier system. The foreign origin identifier system may use available account information from a security alert as a basis for determining if the account is logged into an asset that does not have an agent on it. The data point, or data point, produced by the foreign object identifier system may be a Boolean value indicative of true or false.

Continuing this implementation, a motivating basis for the foreign origin identifier system is that security alerts triggered by accounts that are logged into assets that do not have agents on them may be performing actions that would trigger security alerts. In this implementation, this data point may be used as a basis for filtering a set of security alerts, such as security alerts in a queue, to prioritize security alerts where there is additional activity that may be associated with a higher likelihood of a true detection of a security threat.

In some implementations, the security service platform may comprise a major incident response modeling system. The major incident response modeling system may use observed tactics, techniques, and protocols (TTP) usage from major incidents as a basis for building one or more models.

Continuing this implementation, in this example, based on a comparison of ongoing security alerts in a compute environment to the one or more models, the major incident response modeling system may determine a data point that indicates a likelihood that a security threat is a high, or highest, priority based on the security threat being associated with being major, impactful, expensive to resolve, or associated with sensitive data. In this implementation, the major incident response modeling system may be used to review security alerts in aggregate after their detection to determine a notification, or output, on which to base a reprioritization of security alerts.

By contrast, in traditional systems, security services perform either detect security threats or manage incident responses, but do not correlate or determine any relationship between a security threat and the severity of consequences of an incident.

In some implementations, the security service platform may comprise an attacker TTP modeling system. The attacker TTP modeling system may determine a signature, or detection rule, for TTP usage based on either internal or external reports on attacker techniques. Based on the determined signatures, or detection rules, the attacker TTP modeling system may derive a data point that indicates a likelihood that activity within a compute environment is malicious activity by a threat group, such as a known threat group.

In some implementations, the security service platform may determine a security alert based on whether a detection rule that is triggered in association with an activity within the compute environment represents a deviation from non-threatening activity for an asset, where the security alert may be associated with an asset being used in association with the activity, such as used with the asset for a first time. In other implementations, the security service platform may determine detection rule priority based on user-specified priority levels for detection rules.

In some implementations, the security service platform may use outputs from one or more of the security systems set. The security systems set may include the attacker TTP modeling system, major incident response modeling system, foreign origin identifier system, organization specific fidelity system, service level agreement logging system, alert grouping statistics system, alert grouping system, novel alert classifier system, or the process alert system.

In some implementations, the security service platform may determine a set of security alerts, where the set of security alerts are determined by one or more of the security systems set. In some examples, the set of security alerts may comprise a queue.

In some implementations, based on a security alert being based on multiple ones of the security systems set, a user interface may be implemented to efficiently communicate contents of the multiple ones of the security systems. For example, multiple instances of a detection rules triggered by multiple ones of the security systems set may be simplified, or deduplicated, and links or connections between accounts and assets may be graphically linked.

In some implementations, the security service platform may implement one or all of the security systems within the security systems set. For example, telemetry data from a given compute environment may be received by each of the security systems implemented by the security service platform. If any single security system within the implemented determines a respective security alert, then the security service platform may generate security alert data indicative of each respective security alert. In one example, storing the respective security alert data may be carried out with a priority object. A priority object may include respective fields associated with a respective one or more security systems. In some examples, each respective field may store one or more indications associated with a respective security alert. In some examples, the one or more indications may indicate an asset, an account, a time, one or more activities, network data indicative of characteristics of activities or operations, and so on.

In some implementations, the security service platform may raise or lower a priority level of a security alert based on which ones, or how many, of the security systems have determined a corresponding security alert. For example, if a single one of the security systems determines a security alert, but none of the remaining security systems implemented by the security service platform has generated a security alert, then the security service platform 102 may lower a priority level of the security alert.

Continuing this implementation, and as another example, if more than a threshold quantity of security systems determines a security alert, then the overall security alert priority level may be raised. In other implementations, different rules for how to combine or prioritize security alert data from one or more security systems may be used.

In some implementations, the security service platform may implement a machine learning model. For example, the machine learning model may train on one or more datasets that correlate a given priority object with a validated true detection of a security threat. A given priority object within a training dataset may indicate which of the security systems indicated a security alert and which did not indicate a security alert.

Similarly, the training dataset may indicate respective prioritization data associated with respective ones of the security systems. Given a trained model, the security service platform may determine a security alert based on a priority object determined in real-time that is provided to the trained model, where output of the trained model may be an indication of a security alert. Output of the trained model may also indicate a priority level of a security alert.

In some implementations, the security service platform may be implemented on various types of system architectures. As one example, a local network may implement a network sensor and detect network events. In this example, the local network may be a client network that provides one or more services to clients. The client network may be a compute environment, such as a cloud compute environment, an on-prem compute environment, or another type of compute environment. Further in this example, the remote network may be a cloud compute environment, a data center, or a different client network.

In various embodiments, the security service platform may include a network sensor and one or more cloud services. The security service platform may be implemented, at least in part, by the network sensor and/or by the cloud service(s).

In some implementations, the security service platform may include a network sensor that receives or accesses network data and determines network events, such as access attempts on one or more network or system resources. Telemetry data may comprise the network events. The network events may include data used in rule matching or other processing by one or more security systems included within the security service platform. The network sensor may be implemented on a client network, and the telemetry data may be transmitted to the security service platform.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to obscure the disclosed embodiments.

Referring to FIG. 1, an example computing environment illustrates various components of a security service platform, in accordance with some embodiments.

In some implementations, as illustrated within FIG. 1, a security service platform, depicted as security service platform 102, may receive telemetry data 152, process the telemetry data 152, and determine a security threat. In this example, if the security service platform 102 determines a security threat, the security service platform 102 may generate a security alert as an initial remediation response. Security alert notification data 154 may be indicative of the security alert.

In this example, the security service platform 102 may comprise an alert interface 106, a process alert classifier module 108-1, a novel alert classifier module 108-2, an alert grouping module 108-3, an alert grouping statistics module 108-4, a service level agreement logging module 108-5, an organization specific fidelity module 108-6, a foreign origin identifier module 108-7, a major incident response modeling module 108-8, an attacker TTP modeling module 108-9, alert sets 116.

In some implementations, the security service platform 102 operations include at least: event data collection and security analysis. In some examples, the security service platform 102 may be implemented on a client network, a data center, a cloud compute environment, among other computing environments. In this example, security service platform 102 may receive telemetry data 152 from a network sensor operating on a client network. The security service platform 102 may implement security analysis using a security systems 108.

In some implementations, telemetry data 152 may comprise network events within a compute environment, such as a client compute environment. Network events may be determined by a network sensor that receives or accesses network data or operations within a compute environment. A network event may comprise access attempts on one or more network or system resources. The network events may include data used in rule matching or other processing by one or more security systems included within the security service platform 102. A network sensor may be implemented on a client network, and the telemetry data 152 may be transmitted to the security service platform 102.

In some implementations, telemetry data 152 may comprise a stream of TLS events, and include: a timestamp and flow 4-tuple (IPs, ports), also, start protocol (flow may have started as HTTP or SMTP and then upgraded to TLS); Client Hello, including JA3 and SNI strings; Server Hello, including JA3S and certificate; a certificate that may include mostly strings and then two timestamps for cert valid period; strings for issuer DN, subject CN, cert serial number, and key fingerprint.

In some implementations, one or more of the security systems 108 may perform a security analysis on the telemetry data 152. For example, one or more of the security systems 108 may determine that one or more network events indicated by the telemetry data 152 are indicative of a cyberattack.

In some implementations, security alert data 110 may be indicative of a cyberattack. In this example, process alert classifier module 108-1 may determine security alert data 110-1, novel alert classifier module 108-2 may determine security alert data 110-2, alert grouping module 108-3 may determine security alert data 110-3, alert grouping statistics module 108-4 may determine security alert data 110-4, service level agreement logging module 108-5 may determine security alert data 110-5, organization specific fidelity module 108-6 may determine security alert data 110-6, foreign origin identifier module 108-7 may determine security alert data 110-7, major incident response modeling module 108-8 may determine security alert data 110-8, and attacker TTP modeling module 108-9 may determine security alert data 110-9.

In some implementations, for a given security system 110, the security alert data 110 may indicate a security alert, including indications of one or more of: account identifiers, assets, IP addresses, times, operations, activity, including other indications of activity associated with a cyberattack. In some examples, for a given security system 108, if telemetry data 152 is not indicative of a cyberattack, the respective security alert data 110 may be indicative of no attack or may not be generated.

In some implementations, priority object 112 may comprise security alert data 110 from one or more of the security systems 108-1-108-9. In this example, there are nine (9) security systems, however, in general, there may be more or fewer security systems. In some examples, each security system, based on the priority object 112 having a defined schema, may generate security alert data that is included within the priority object 112. In some examples, a user interface may be specified to indicate rules for processing security alert data within the priority object 112.

In some implementations, a rule may specify that if two specified security systems generate security alerts with priorities greater than or equal to a threshold priority value, then a security alert that comprises the priority object will be directed, or routed, to a specified alert queue 118. In general, a rule may apply logical operators, conditionals, or other filters or restrictions to any one or more values within one or more of the security alert data values within a priority object 112.

In some implementations, additional security systems, or prioritization systems, may be invoked based on results of two or more security systems 108. In this example, given that each security system may apply structured data to each security alert, then multiple security system may apply different sets of data labeling to a dataset that may be used in data science analysis.

In some implementations, the security alert data 154 may comprise the priority object 112. In some examples, based on overall prioritization data, the security alert data 154 may be included within one or more of the alert sets 116. An alert set 116 may comprise a plurality of alert queues 118-1-118-N. In other examples, each alert set among the alert sets 116 may be implemented by a different data structure. In this example, there may be one or more alert queues associated with a given prioritization value or with a type of remediation or validation to be initiated in response to the security alert data 154.

In some implementations, the security alert data 154 may include one or more portions of the event data associated with a cyberattack, or potential cyberattack. The security alert data 154 may also include information related to a user profile associated with the event data, geographic information of a user, network asset target, attempted activities, among other information associated with a security threat.

The security service platform 102 may include an alert interface 106. In some examples, the security service platform 102 may periodically receive telemetry data 152 from compute environment being monitored for security purposes, such as a client network. In other examples, the security service platform 102 may initiate a query to determine whether telemetry data 152 is available.

In other examples, the security service platform 102 may use a storage service for communicating between compute environments. As one example, the security service platform 102 may use a cloud storage service that may include notification protocols, such as Amazon Web Services (AWS) S3 buckets.

In some implementations, the alert interface 106 may be used by the security service platform 102 to generate alerts and/or initiate other remediation actions. For example, a client service being monitored by the security service platform 102 may provide a user interface, such as a dashboard, user interface element, or other indication of security status. In this example, the alert interface 106 may communicate security alert data 154 to a client service, a security orchestration center, or to some other target for further remediation responses.

FIG. 2 is a block diagram illustrating an example computing environment 200 that may include a client network and cloud compute environment, in accordance with some embodiments.

As depicted in FIG. 2, the security service platform 102 may be implemented among a client network 202 and a cloud compute environment 204. A client network 202 may be implemented as a cloud compute environment, an on-prem compute environment, or another compute environment. In this example, the client network 202 comprises a network sensor 104 and a scan engine 108. A cloud compute environment is described in greater detail with respect to FIG. 3.

The network sensor 214 may be implemented to receive network data 252 and determine network events containing relevant data for later rule matching. On the network sensor 214, these events and relevant data may be represented as telemetry data 152. In this example, the security service platform 102 may be implemented within cloud compute environment 204. The security service platform 102 may be implemented as described with respect to FIG. 1. In some implementations, the network sensor 214 may include the scan engine 218. The scan engine 218 may scan network data 252 to determine network events and generate telemetry data 152.

In this implementation, the client network 202 may provide one or more services to one or more clients or users. The one or more services may be implemented by one or more service modules 206. Users may access the one or more services over a network, such as network 208, where the network 208 may be a local network, a regional network, or a global network, such as the internet. Among the users, there may be one or more threat actors 210. A threat actor 210 may be an AI (artificial intelligence), a bot, a human, or some other platform used to conduct cyberattacks.

In this example, the client network 202 may communicate with the cloud compute environment 204 over a network 212. In this example, the network sensor 214 may periodically, or in response to determining one or more instances of telemetry data 152, provide or transmit telemetry data 152 to the security service platform 102. In response to the security service platform 102 receiving, or having access to, the telemetry data 152, the security service platform 102 detect, or determine, a cyberattack, as described in greater detail with respect to FIG. 1.

Continuing this example, given the telemetry data 152, the security service platform 102 may determine one or more cyberattacks, as described with greater detail with respect to FIG. 1.

Figure 3:
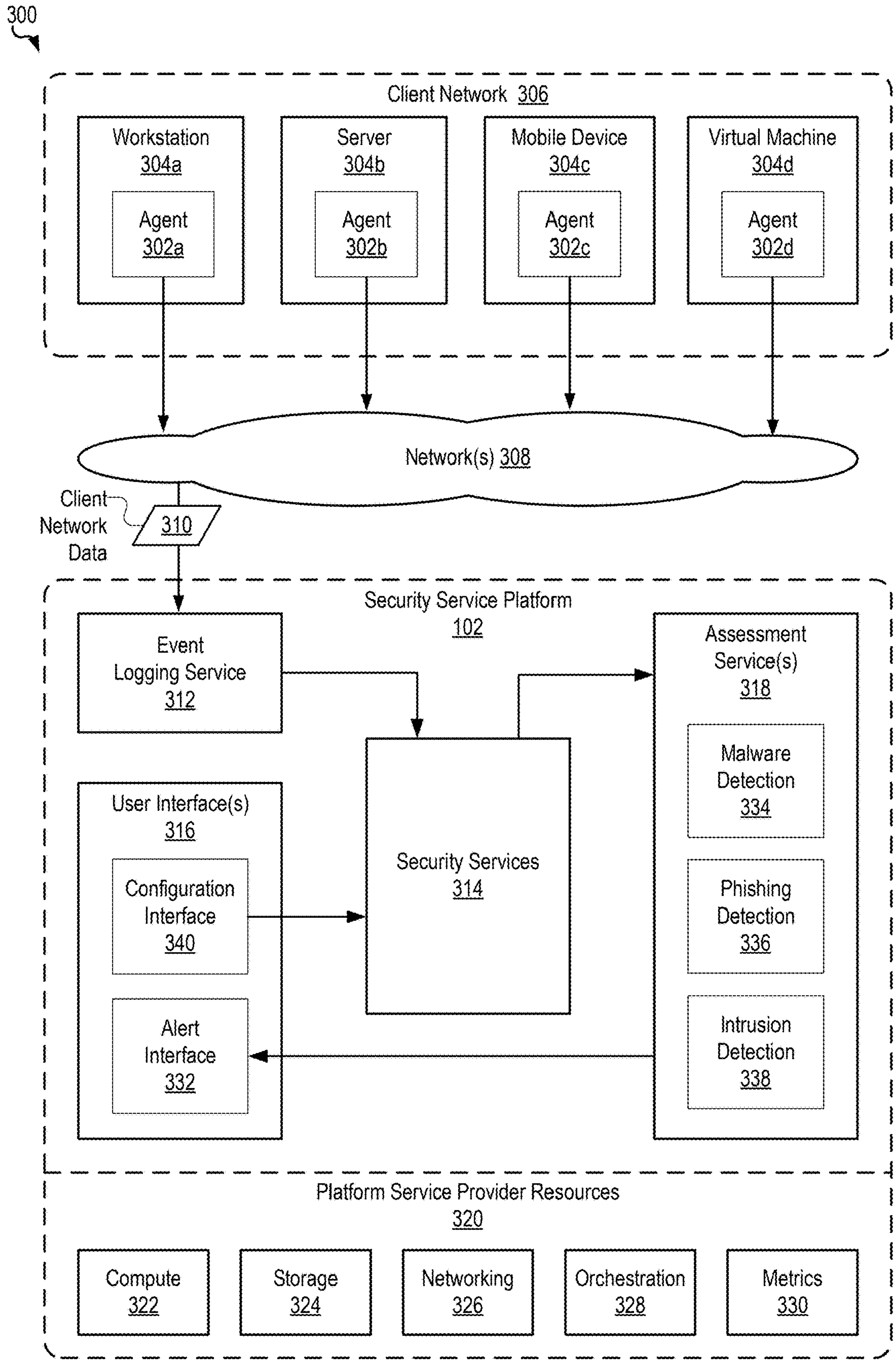
FIG. 3 is a block diagram illustrating example computing resources that implement a security service platform, in accordance with some embodiments.

FIG. 3 is a block diagram illustrating example computing resources that implement a security service platform (e.g., security service platform 102 in FIG. 1) in an example security environment 300, in accordance with some embodiments.

The security service platform 102 may comprise one or more services implemented within a cloud computing environment and/or on a platform service provider network, such as a platform-as-a-service (PaaS) network, an infrastructure-as-a-service provider (IaaS) network, or a software-as-a-service (SaaS) network. The security service platform 102 may be configured to communicate with agents 302*a*-302*d* deployed on computing resources 304*a*-304*d* in a client network 306.

In this example, the computing resources 304*a*-304*d* are depicted as a workstation, a server, a mobile device, and a virtual machine, respectively. In other examples, a computing resource 304 may comprise personal computers, cloud compute instances, laptops, among other types of computing resources, or some other resource that may be vulnerable to a cyberattack. Computing resources are described in greater detail below.

In this example, agents 302 may communicate with the security service platform 102 over one or more intermediary networks 308. In some embodiments, the agents 302 may be configured to collect or compile network activity data or network event data, and transmit the data, depicted as client network data 310, to the security service platform 102. The security service platform 102 may receive network activity data from many different client networks operated by different entities, companies, organizations, groups, etc., and perform remote monitoring of the networks of these different clients.

As shown, the client network 306 in this example includes different types of computing resources, such as a workstation 304*a*, a server 304*b*, a mobile device 304*c*, and a virtual machine 304*d*. The virtual machine 304*d* may be an instance of a computer and operating system that is emulated and hosted on a physical virtual machine host. The virtual machine host may implement virtualization hardware and/or software (e.g., a hypervisor) to execute and manage multiple instances of guest operating systems. Example implementations of such virtualization technologies include VMware ESX/ESXI, Microsoft Hyper-V, Amazon Web Services, and Microsoft Azure.

Another type of virtualized execution environment may be a hosted container, which provides a portable and isolated execution environment over a host operating system of a physical host. Examples of container hosting technologies include Docker, Google Kubernetes, Amazon Web Services, and Microsoft Azure. In some embodiments, the virtual machine 304*d* may be hosted in a platform service provider network, such as the platform service provider network that is hosting the security service platform 102. In some embodiments, the agents 302 may be deployed on other types of computing systems, including embedded systems, networking devices, storage devices, Internet-of-Things (loT) devices, vehicles, and the like.

In various embodiments, the network 308 may encompass any suitable combination of networking hardware and protocols necessary to enable communications between the agents 302 and the security service platform 102. In some embodiments, the remote machines 304 may execute in a private network of a company, behind a company firewall, and the network 308 may include a public network such as the Internet, which lies outside the firewall. The network 308 may encompass the different telecommunications networks and service providers that collectively implement the Internet.

In some embodiments, the network 308 may also include private networks such as private local area networks (LANs), private wide area networks (WANs), or private wireless networks. The network 308 may be implemented using different hardware (e.g., modems, routers, switches, load balancers, proxy servers, etc.) and software (e.g., protocol stacks, routing software, firewall/security software, etc.) for establishing networking links between the remote machines 304 and the security service platform 102. In some embodiments, the agents 302 may transmit the client network data 310 to the security service platform 102 over secure communication channels such as transport layer security (TLS) connections implemented over the network 308.

As shown in this example, the security service platform 102 is implemented using a number of supporting services 312, 314, 316, and 318 implemented by the platform service provider network. Clients of the security service platform 102 may convey service requests to and receive responses from these services via their respective service interfaces. In some embodiments, the service request and responses may be defined as part of a RESTful API (e.g., one or more web services). The requests and responses may be formatted as JSON documents. In some embodiments, the security service platform 102 may implement service interfaces using other types of remote procedure calling protocols, such as Google Protocol Buffers. The platform service provider network may provide the hardware and/or software needed to implement service endpoints for these services, and the request routing facilities to ensure that a request is properly routed to the appropriate endpoints.

As shown, the platform service provider network may provide different types of computing resources, such as platform service provider resources 320, which can be used by customers to implement hosted services. As shown, the platform service provider may provide resource services such as compute resource service 322, storage resource service 324, networking resources service 326, orchestration service 328, and resource metrics service 330. The services of the security service platform 102 may be built using these underlying resource services provided by the platform service provider.

In some embodiments, the platform service provider resources 390 may implement features such as load balancing of service requests and/or dynamic management and scaling of service node pools. In some embodiments, each of the services 312, 314, 316, and 318 may be implemented using a pool of service nodes provided by the platform service provider, which may be individual instances of virtual machines. In some embodiments, the platform service provider may be a provider such as Amazon Web Services or Microsoft Azure.

In some embodiments, the security service platform 102 may be configured to monitor, analyze, and respond to security-related incidents that are detected in the remote client networks 306. For example, the client network data 310 may indicate network traffic data 120 and/or network sensor processed data 122, where the security service platform 102 may determine a cyberattack as described herein.

In some embodiments, the security service platform 102 may implement an event logging service 312 that receives client network data 310 from a client network 306 and stores the received data. The event logging service 312 may implement service functionality to allow users or other software components to query the event logs.

As shown, in some embodiments, the assessment service(s) 318 may implement a variety of monitoring processes to generate alerts in response to detected security problems in the client network 306. These alerts may be forwarded to an alert interface 332, which may allow human security analysts to perform a more in-depth examination of any underlying security problems. For example, in some embodiments, a malware detection module 334 may examine collected machine event logs to detect installation of a particular type of malware executable.

As another example, a phishing detection module 336 may examine the email event logs to detect phishing attacks using new or unusual email addresses, web addresses, or email content. As yet another example, an intrusion detection module 338 may examine the network event logs to detect suspicious communication patterns or attacker packet signatures. In some embodiments, the alerts generated by the assessment service(s) 318 may trigger automated mitigation actions to be performed on the client network 306 to address detected threats in the client network.

In some embodiments, the security service platform 102 may implement one or more user interface(s) 316, which may be implemented as GUIs or web interfaces viewable using a web browser. In some embodiments, these user interfaces 316 may be implemented by client-side applications. As shown, the user interfaces may include the alert interface 332 to notify users of detected alerts. In some embodiments, the alert interface 332 may be accessible from both the client network 306 and a central monitoring location where security analysts are monitoring the client network.

In some embodiments, the user interface(s) 316 may also implement a configuration interface 340. The configuration interface 340 may be used to configure various aspects of the security service platform 102, including the security service 314. For example, the configuration interface 340 may be used to control various aspects of how the security service 314 operates, including initiating a scan, indicating one or more computing resources, and/or specifying a scanning schedule.

In some implementations, the security service platform 102 may be implemented within a container system of a cloud computing environment or a container system of a data center. For example, a container system may be implemented by one or more container orchestration systems, including Kubernetes™, Docker Swarm™, among others. The container orchestration system may run on a cluster of nodes. In some examples, a given node may comprise a container runtime, where the given node may be implemented by one or more compute instances provided by a cloud services provider. In some examples, a given node among the cluster of nodes may comprise a container runtime, compute resources, memory, and one or more container instances.

In some implementations, the security service platform 102 may comprise multiple services. For example, the security service platform 102 may comprise services implemented by containerized applications operating on one or more nodes of a cluster. In this example, the security service platform 102 may be implemented by a one or more containerized applications.

Figure 4A:
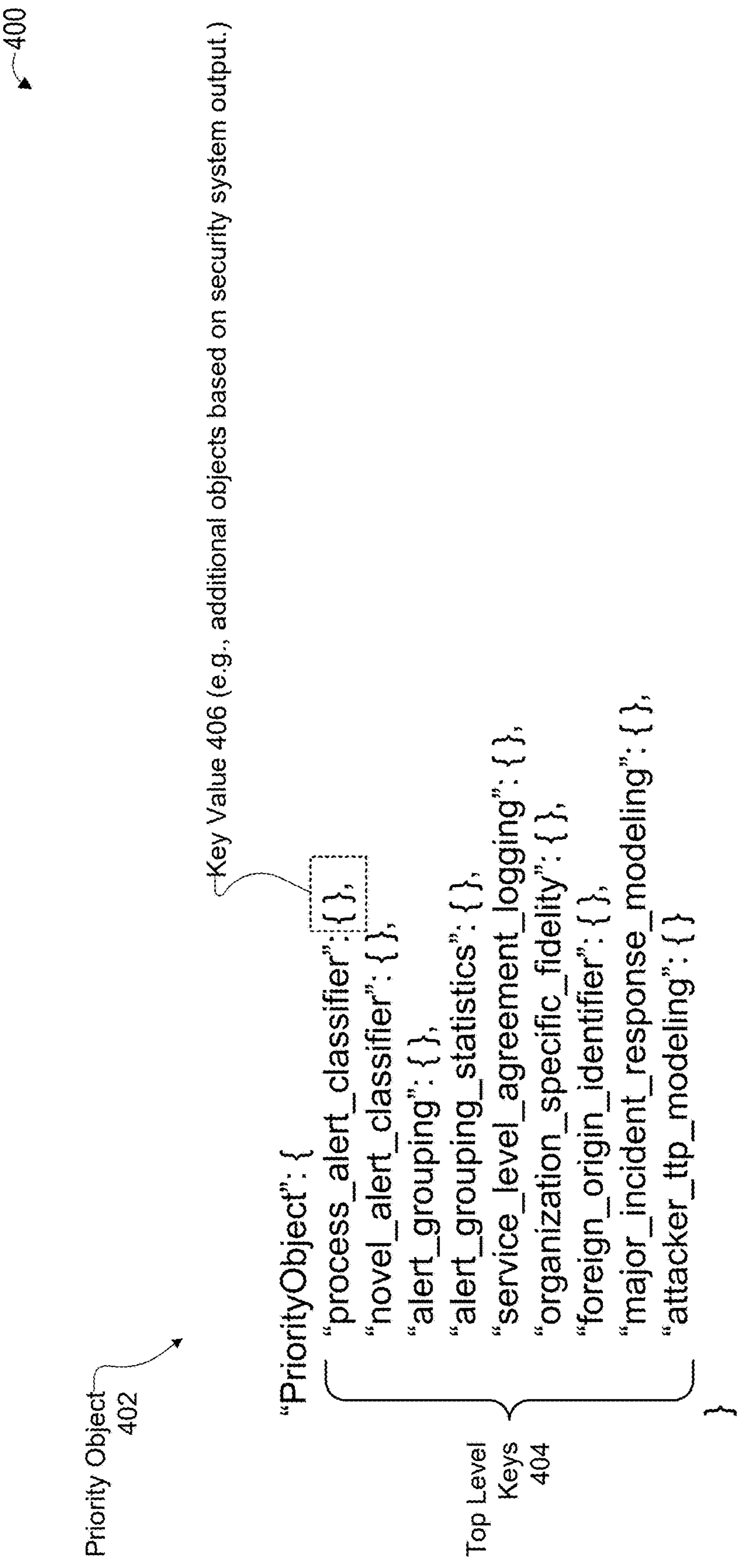
FIG. 4A is a block diagram depicting data formats of a priority object used by the security service platform, in accordance with some embodiments.

FIG. 4A is a block diagram 400 depicting a data format for a priority object, according to some implementations.

In some implementations, storing the respective security alert data 110 may be carried out by storing the security alert data 110 within a priority object 112. Priority object 112 is represented, in one implementation, as priority object 402. A priority object 402 may include respective fields associated with a respective one or more security systems. In some examples, each respective field may store one or more indications associated with a respective security alert. In some examples, the one or more indications may indicate an asset, an account, a time, one or more activities, network data indicative of characteristics of activities or operations, and so on.

In some implementations, priority object 402 may comprise security alert data 110 from one or more of the security systems 108-1-108-9. In this example, there are nine (9) security systems, however, in general, there may be more or fewer security systems. In some examples, each security system, based on the priority object 402 having a defined schema, may generate security alert data that is included within the priority object 402.

In some implementations, the priority object 402 may comprise one or more keys associated with: alert grouping data indicative whether a security alert is part of a security alert group; alert novelty data indicative of whether a security alert is common or uncommon for a given compute environment or for a given account or user; source asset data indicative of whether a security alert is based on an asset not having an agent on it; SLA data describing circumstances that affect whether a SLA may be violated; environment specific fidelity data indicative of whether a given security alert is more critical at a given compute environment; storage data on where security alerts may be stored; script data indicative of scripts that automate querying logs and answering questions; IR MITRE TTP heatmapping data indicative of incident modeling; TTP threat signature data indicative of threat signatures; among other types of data.

In some implementations, a user interface may be specified to indicate rules for processing security alert data within the priority object 402. In some examples, a rule may specify that if two specified security systems generate security alerts with priorities greater than or equal to a threshold priority value, then a security alert that comprises the priority object will be directed, or routed, to a specified alert queue 118. In general, a rule may apply logical operators, conditionals, or other filters or restrictions to any one or more values within one or more of the security alert data values within a priority object 402. In some examples, the priority object 402 may include one or more fields to specify one or more rules.

As depicted in FIG. 4A, priority object 402 may comprise a schema that includes top level keys 404, where each top level key 404 may nest one or more additional objects, such as key values 406. As described in greater detail with respect to FIG. 4B, a key value 406 may comprise additional key values associated with output from a security system 110.

FIG. 4B is a block diagram 400 depicting a data format for a priority object, according to some implementations.

In some implementations, a top level key 404 of a priority object 402 may include additional key values 406. As depicted in FIG. 4B, key value 450 may be among the multiple top level keys 404 described in FIG. 4A. In this example, key value 450 is indicative of a security system 110-9, described in FIG. 1, and depicted as security system "attacker_ttp_modeling". In this example, key value 450 is associated with a schema, depicted as security system schema 452.

In some implementations, security system schema 452 may comprise multiple keys, where each key may be associated with content and a data type. As depicted in FIG. 4B, key value 450, "attacker_ttp_modeling", comprising keys "owner" ~, "owner_contact", "notable", "priority", "confidence_rating", "predicted_disposition", "description", "metadata", "notes", and "last_modified". Table 1 provides greater detail regarding content and data types associated with key value 450. While Table 1 and key value 450 provide an example schema, in other examples, different quantities of keys, types of content, and/or additional or fewer key characteristics may be specified depending on characteristics of any output from a security system 108.

TABLE 1

| KEY | CONTENT DESCRIPTION | DATA TYPE |
|---|---|---|
| owner | Group or organization responsible for the content of this data object. | String |
| owner_contact | Contact information for questions about this particular security system. | String \| null |
| notable | Description of notable information about security alert, if any. | True \| False \| null |
| priority | A priority rating, or prioritization value, determined by a security system. | 0 - N (float?) |
| confidence_rating | 4 confidence rating, or percentage, in a determination of a security alert by a security system. | Float \| null |
| predicted_disposition | Statistics indicative of a likelihood of a disposition. | Json {"<disp>": float} |
| description | A disposition determined by a security system for a security alert. | String |
| metadata | Arbitrary descriptive data provided by a security system. | Json \| null |
| notes | Description of what a security system does, or how the security system makes determinations. | String |
| last_modified | Date of most recent modification of any key value by the security system. | String "YYYY-MM-DD hh:mm:ss" \| null |

In some implementations, the schema described in Table 1 provides multiple different types of result output from different security systems 108. In this example, the "owner" key may indicate information about a party responsible for content of the key value 450 data object. In this example, the "owner_contact" key may indicate information about how or where to submit questions, suggestions, complaints, or other information regarding the associated security system. In this example, the "notable" key may indicate Boolean output from a security system, which may be indicative of whether or not a security alert for an associated security system is common or uncommon to a compute environment. In this example, the "priority" key may indicate output such as, "info", "low", "medium", "high", "critical", or some other priority rating, or prioritization values. In this example, "confidence_rating" may indicate data from automated prioritization systems associated with a statistical confidence in a security alert determination. In this example, "predicted_disposition" may indicate a likelihood of dispositions that may appear at least once in a group of different security alert types related to a same user or a same asset. In this example, the "description" key may indicate an explanation of what the associated security system determined for a given security alert. The "metadata" key may indicate arbitrary data used by the security system in determining a security alert, including how the data was processed to make the determination. In this example, the "notes" key may indicate a purpose of the security system, how the security system works, and/or underlying principles of how the security system operates. The "last_modified" key may indicate a date, or timestamp, of when the security system most recently modified the key value 450 data object, which in some implementations may be used to determine security alert groupings, as described above.

Figure 5:
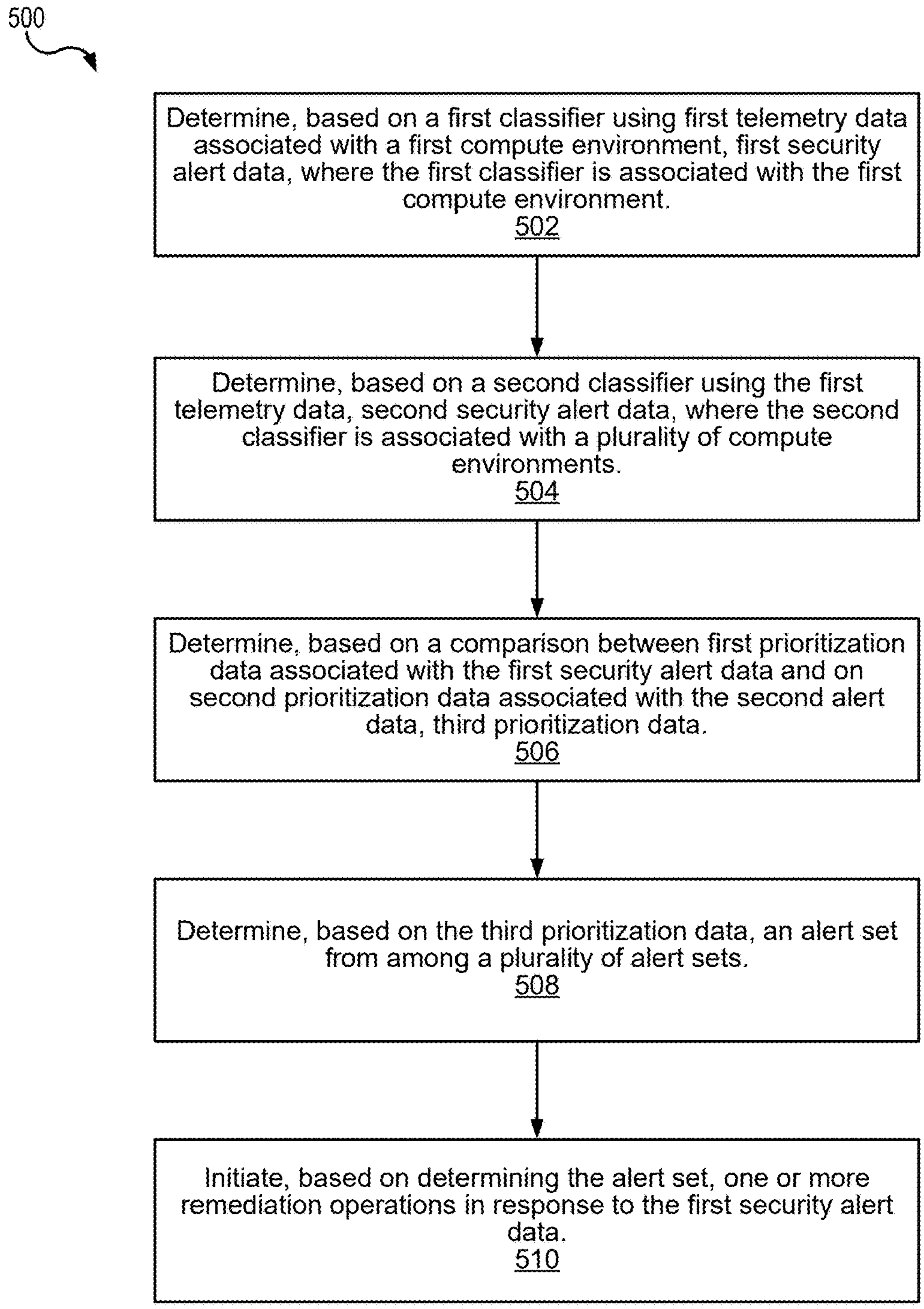
FIG. 5 is a flowchart that illustrates an example of the security service platform, in accordance with some embodiments.

FIG. 5 illustrates a flowchart 500 that depicts an example of the security service platform 102, in accordance with some embodiments. In FIG. 5, one or more hardware processors may be used to implement the example process, where the hardware processors are described with respect to FIGS. 3 and 9.

FIG. 5 illustrates an example process that includes: determining, at 502, based on a first classifier using first telemetry data associated with a first compute environment, first security alert data, where the first classifier is associated with the first compute environment; determining, at 504, based on a second classifier using the first telemetry data, second security alert data, where the second classifier is associated with a plurality of compute environments; determining, at 506, based on the first prioritization data associated with the first security alert data and on second prioritization data associated with the second alert data, third prioritization data; determining, at 508, based on the third prioritization data, an alert set from among a plurality of alert sets; and initiating, at 510, based on determining the alert set, one or more remediation operations in response to the first security alert data.

Determining, at 502, based on a first classifier using first telemetry data associated with a first compute environment, first security alert data, where the first classifier is associated with the first compute environment may be carried out as described with respect to FIGS. 1-4. For example, the network sensor 214 may determine a plurality of network events based on network data within a first compute environment, such as a client network 202. First security alert data may be security alert data 110-1 determined by a first one of the security systems 110, such as process alert classifier module 108-1. In this example, the first classifier may be the process alert classifier module 108-1 determining, using the first telemetry data, the first security alert data using machine learning models associated with the first compute environment. In this example, the process alert classifier module 108-1 may also determine first prioritization data associated with the first security alert data.

Determining, at 504, based on a second classifier using the first telemetry data, second security alert data, where the second classifier is associated with a plurality of compute environments may be carried out as described with respect to FIGS. 1-4. For example, process alert classifier module 108-1 may determine, using the first telemetry data, the second security alert data using machine learning models associated with a plurality of compute environments, as described with respect to FIG. 1. In this example, the process alert classifier module 108-1 may also determine second prioritization data associated with the second security alert data.

Determining, at 506, based on the first prioritization data associated with the first security alert data and on second prioritization data associated with the second alert data, third prioritization data may be carried out as described with respect to FIGS. 1-4. For example, the security service platform 102, as described with respect to FIG. 1, may use the prioritization data determined based on a local compute environment, in this example, the first compute environment, to reprioritize security alert data.

Determining, at 508, based on the third prioritization data, an alert set from among a plurality of alert sets may be carried out as described with respect to FIGS. 1-4. For example, the security service platform 102 may determine which alert queue 118 from among the alert sets 116 to select to include the first security alert data.

Initiating, at 510, based on determining the alert set, one or more remediation operations in response to the first security alert may be carried out as described with respect to FIGS. 1-4. For example, the security service platform 102 may use the alert interface 106 to provide alert information indicative of the first security alert data to one or more destinations.

FIG. 6 is flowchart 600 that illustrates an example of the security service platform 102, in accordance with some embodiments. In FIG. 6, one or more hardware processors may be used to implement the example process, where the hardware processors are described with respect to FIGS. 3 and 9.

FIG. 6 illustrates an example process that includes: determining, at 602, by a first security system processing first telemetry data associated with a first compute environment, first security alert data comprising a first one or more characteristics; determining, at 604, by the first security system processing the first telemetry data, first prioritization data associated with the first security alert data; determining, at 606, by a second security system processing second telemetry data associated with the first compute environment, second security alert data comprising a second one or more characteristics; determining, at 608, by the second security system processing the second telemetry data, second prioritization data associated with second security alert data; determining, at 610, based on the first security alert data and the second security alert data, third security alert data comprising the first one or more characteristics, the first prioritization data, the second one or more characteristics, and the second prioritization data; and initiating, at 612, based on determining the third security alert data, one or more remediation operations.

Determining, at 602, by a first security system processing first telemetry data associated with a first compute environment, first security alert data comprising a first one or more characteristics may be carried out as described with respect to FIGS. 1-4. For example, the network sensor 214 may determine a plurality of network events based on network data within a first compute environment, such as a client network 202. In this example, first telemetry data may be telemetry data 152, which may comprise one or more network events that may be indicative of a security threat. First security alert data may be first security alert data 110-*i* determined by a first security system 108-*i*, that may be any one of the security systems 108-1-108-9. First security alert data 110-*i* may be among the security alert data 110-1-110-9.

Determining, at 604, by the first security system processing the first telemetry data, first prioritization data associated with the first security alert data may be carried out as described with respect to FIGS. 1-4. In this example, the first security system 108-*i* may also determine first prioritization data associated with the first security alert data.

Determining, at 606, by a second security system processing second telemetry data associated with the first compute environment, second security alert data comprising a second one or more characteristics may be carried out as described with respect to FIGS. 1-4. For example, the second security alert data may be second security alert data 110-*j* determined by a second security system 108-*j*, that may be any one of the security systems 108-1-108-9. Second telemetry data may be additional telemetry data from a network sensor 214 operating on the first compute environment. Second security alert data may be second security alert data 110-*j* determined by a second security system 108-*j*, that may be any one of the security systems 108-1-108-9. Second security alert data 110-*j* may be among the security alert data 110-1-110-9.

Determining, at 608, by the second security system processing the second telemetry data, second prioritization data associated with second security alert data may be carried out as described with respect to FIGS. 1-4. For example, the second security alert system 110-*j* may determine second prioritization data as described with respect to FIG. 1.

Determining, at 610, based on the first security alert data and the second security alert data, third security alert data comprising the first one or more characteristics, the first prioritization data, the second one or more characteristics, and the second prioritization data may be carried out as described with respect to FIGS. 1-4. For example, the security service platform 102 may determine a priority object 112 comprising one or more portions of security alert data 110 as described with respect to FIG. 1. In this example, the third security alert data may be security alert data 154 comprising priority object 112, where priority object 112 may comprise the first one or more characteristics, the first prioritization data, the second one or more characteristics, and the second prioritization data.

Initiating, at 612, based on determining the third security alert data, one or more remediation operations may be carried out as described with respect to FIGS. 1-4. For example, the security service platform 102 may use the alert interface 106 to provide alert information indicative of the third security alert data to one or more destinations.

Figure 7:
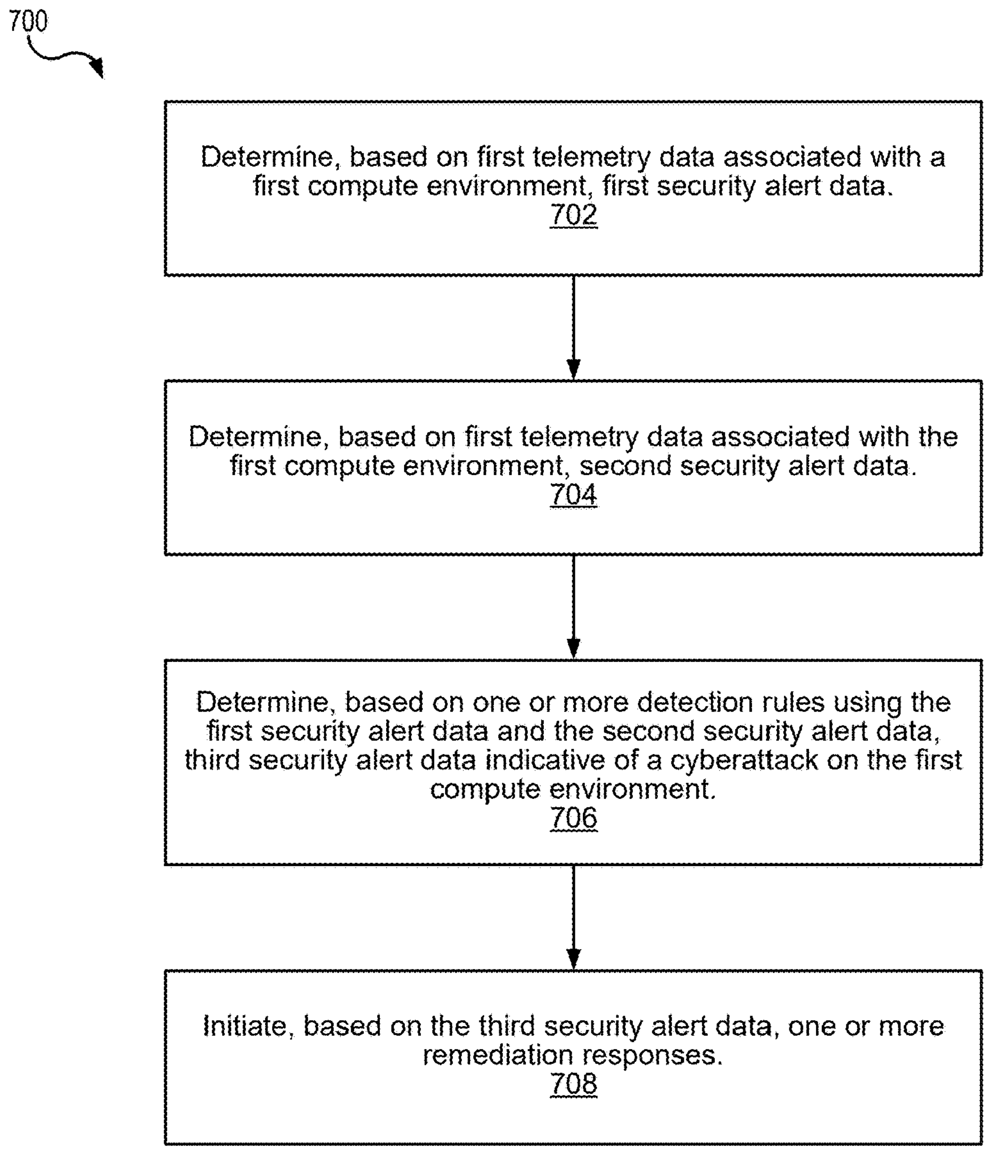
FIG. 7 is a flowchart that illustrates an example of the security service platform, in accordance with some embodiments.

FIG. 7 is flowchart 700 that illustrates an example of the security service platform 102, in accordance with some embodiments. In FIG. 7, one or more hardware processors may be used to implement the example process, where the hardware processors are described with respect to FIGS. 3 and 9.

FIG. 7 illustrates an example process that includes: determining, at 702, based on first telemetry data associated with a first compute environment, first security alert data; determining, at 704, based on first telemetry data associated with the first compute environment, second security alert data; determining, at 706, based on one or more detection rules using the first security alert data and the second security alert data, third security alert data indicative of a cyberattack on the first compute environment; and initiating, at 708, based on the third security alert data, one or more remediations responses.

Determining, at 702, based on first telemetry data associated with a first compute environment, first security alert data may be carried out as described with respect to FIGS. 1-4. For example, the network sensor 214 may determine a plurality of network events based on network data within a first compute environment, such as a client network 202. In this example, first telemetry data may be telemetry data 152, which may comprise one or more network events that may be indicative of a security threat. First security alert data may be first security alert data 110-*i* determined by a first security system 108-*i*, that may be any one of the security systems 108-1-108-9. First security alert data 110-*i* may be among the security alert data 110-1-110-9.

Determining, at 704, based on first telemetry data associated with the first compute environment, second security alert data may be carried out as described with respect to FIGS. 1-4. For example, the second security alert data may be second security alert data 110-*j* determined by a second security system 108-*j*, that may be any one of the security systems 108-1-108-9. Second security alert data may be second security alert data 110-*j* determined by a second security system 108-*j*, that may be any one of the security systems 108-1-108-9. Second security alert data 110-*j* may be among the security alert data 110-1-110-9.

Determining, at 706, based on one or more detection rules using the first security alert data and the second security alert data, third security alert data indicative of a cyberattack on the first compute environment may be carried out as described with respect to FIGS. 1-4. For example, the priority object 112 may include results from security alert data 110-1-110-9, where the security service platform 102 may apply one or more detection rules on any combination of the contents of the security alert data 110 included within the priority object, as described with respect to FIG. 1.

Initiating, at 708, based on the third security alert data, one or more remediation responses may be carried out as described with respect to FIGS. 1-4. For example, the security service platform 102 may use the alert interface 106 to provide alert information indicative of the third security alert data to one or more destinations.

Figure 8:
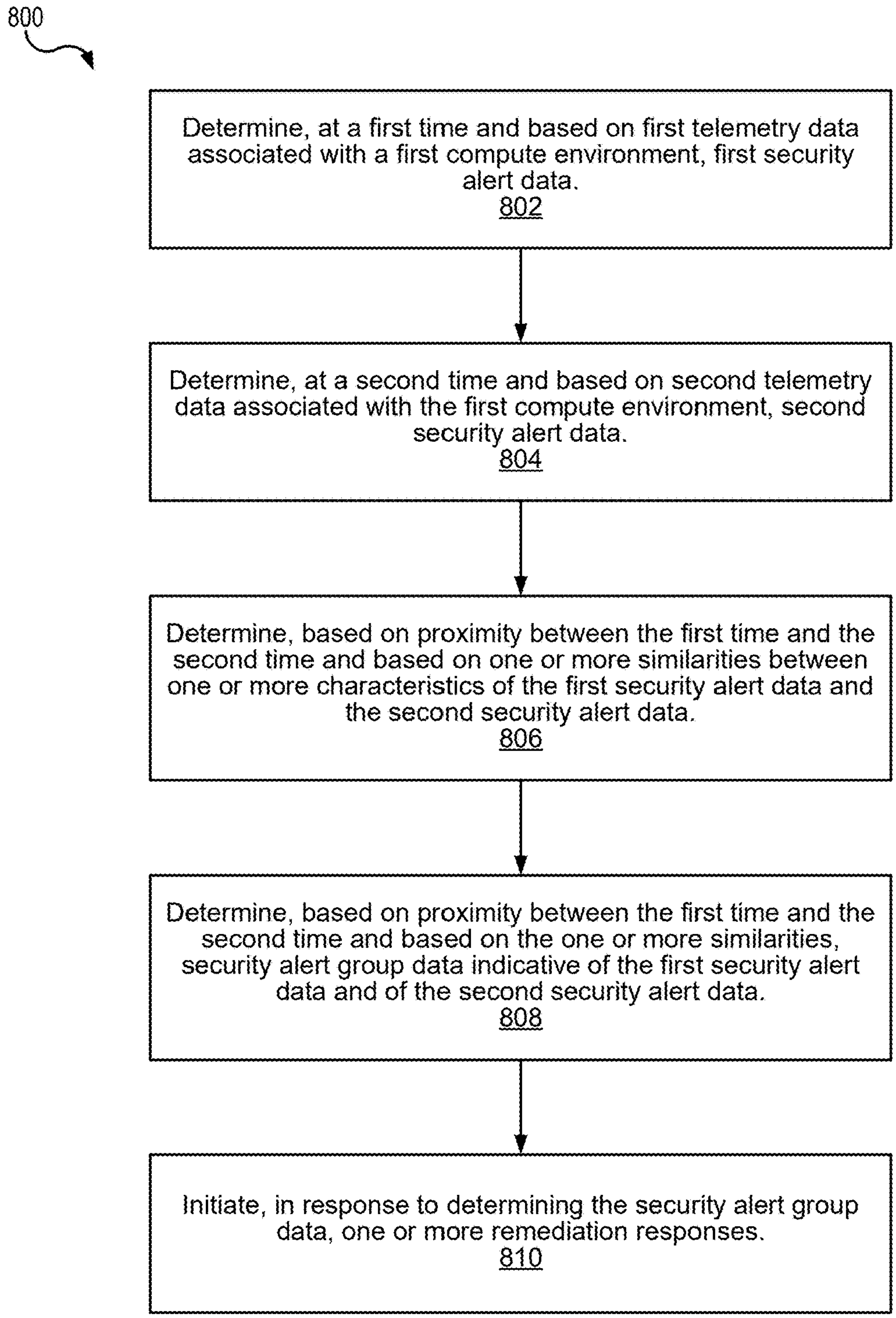
FIG. 8 is a flowchart that illustrates an example of the security service platform, in accordance with some embodiments.

FIG. 8 illustrates a flowchart 800 that depicts an example of the security service platform 102, in accordance with some embodiments. In FIG. 8, one or more hardware processors may be used to implement the example process, where the hardware processors are described with respect to FIGS. 3 and 9.

FIG. 8 illustrates an example process that includes: determining, at 802, at a first time and based on first telemetry data associated with a first compute environment, first security alert data; determining, at 804, at a second time and based on second telemetry data associated with the first compute environment, second security alert data; determining, at 806, based on proximity between the first time and the second time and based on one or more similarities between one or more characteristics of the first security alert data and the second security alert data; determining, at 808, based on proximity between the first time and the second time and based on the one or more similarities, security alert group data indicative of the first security alert data and of the second security alert data; and initiating, at 810, in response to determining the security alert group data, one or more remediation responses.

Determining, at 802, at a first time and based on first telemetry data associated with a first compute environment, first security alert data may be carried out as described with respect to FIGS. 1-4. For example, the network sensor 214 may determine a plurality of network events based on network data within a first compute environment, such as a client network 202. First security alert data may be security alert data 110-1 determined by a first one of the security systems 110, such as process alert classifier module 108-1. In this example, first telemetry data may be telemetry data 152, which may comprise one or more network events that may be indicative of a security threat. First security alert data may be first security alert data 110-*i* determined by a first security system 108-*i*, that may be any one of the security systems 108-1-108-9. First security alert data 110-*i* may be among the security alert data 110-1-110-9.

Determining, at 804, at a second time and based on second telemetry data associated with the first compute environment, second security alert data may be carried out as described with respect to FIGS. 1-4. In this example, second telemetry data may be additional telemetry data received from a network sensor monitoring the first compute environment. Second security alert data may be second security alert data 110-*j* determined by the first security system 108-*i* or by any given security system 108 among the security systems 108-1-108-9. Second security alert data 110-*j* may be determined based on the given security system 108 using the second telemetry data.

Determining, at 806, based on proximity between the first time and the second time and based on one or more similarities between one or more characteristics of the first security alert data and the second security alert data may be carried out as described with respect to FIGS. 1-4. For example, the security service platform 102, as described with respect to FIG. 1, may determine an alert grouping based on use of various techniques.

Determining, at 808, based on proximity between the first time and the second time and based on the one or more similarities, security alert group data indicative of the first security alert data and of the second security alert data may be carried out as described with respect to FIGS. 1-4. For example, the security service platform 102, as described with respect to FIG. 1, may determine an alert grouping based on use of various techniques.

Initiating, at 810, in response to determining the security alert group data, one or more remediation responses may be carried out as described with respect to FIGS. 1-4. For example, the security service platform 102 may use the alert interface 106 to provide alert information indicative of the security alert group data to one more destinations.

Figure 9:
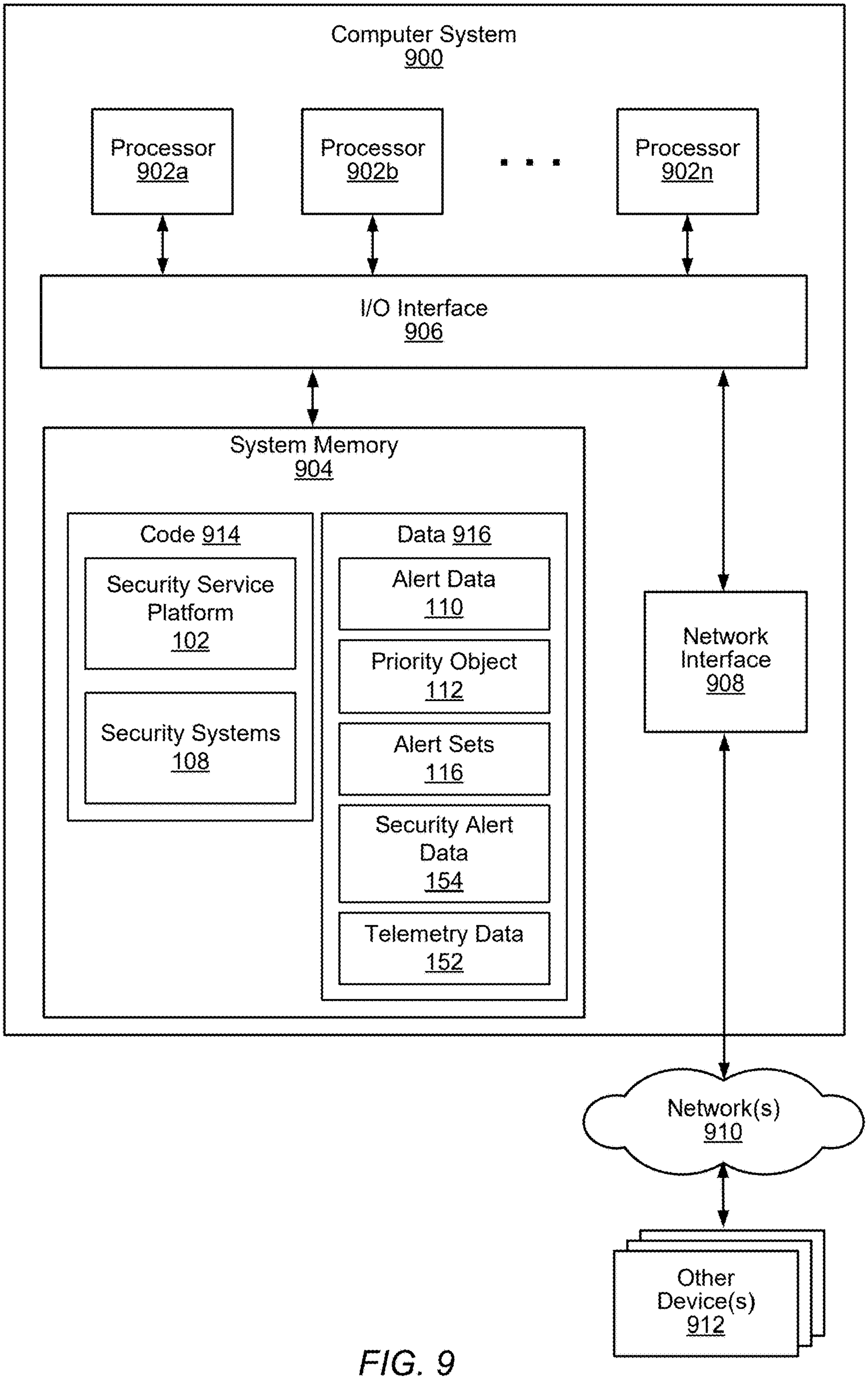
FIG. 9 is a block diagram illustrating an example computer system that implements a security service platform, according to some embodiments.

FIG. 9 is a block diagram illustrating an example computer system 900 that may be used in a security environment that includes a network sensor host that implements an RSS configuration component, according to some embodiments. For example, the computer system 900 may implement the security service platform 102 disclosed herein with reference to FIGS. 1-8.

Computer system 900 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 900 includes one or more processors 902, which may include multiple cores coupled to a system memory 904 via an input/output (I/O) interface 906. Computer system 900 further includes a network interface 908 coupled to I/O interface 906. In some embodiments, computer system 900 may be a uniprocessor system including one processor 902, or a multiprocessor system including several processors 902*a-n*, as shown. The processors 902 may be any suitable processors capable of executing instructions. For example, in various embodiments, processors 902 may implement one of a number of instruction set architectures (ISAs), such as the x86, PowerPC, SPARC, or MIPS ISA.

As shown, the computer system 900 may also include one or more network communication devices (e.g., network interface 908) for communicating with other systems and/or components over a communications network (e.g., network(s) 910). For example, an instance of an application executing on computer system 900 may use network interface 908 to communicate with another server application executing on another computer system, as described herein.

As shown, computer system 900 may use its network interface 908 to communicate with one or more other devices 912, such as persistent storage devices and/or one or more I/O devices. In some embodiments, some of these other devices may be implemented locally on the computer system 900, accessible via the I/O interface 906. In various embodiments, persistent storage devices may include disk drives, tape drives, solid state memory, other mass storage devices, or any other persistent storage device. The computer system 900 may store instructions and/or data in persistent storage devices and retrieve the stored instruction and/or data as needed.

As shown, the computer system 900 may include one or more system memories 904 that store instructions and data accessible by processor(s) 902. In various embodiments, system memories 904 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 904 may be used to store code 914 or executable instructions to implement the methods and techniques described herein. As a non-limiting example, the executable instructions may include instructions to implement an RSS configuration component, network interface driver(s), and/or a network sensor 214, etc., as discussed herein with reference to FIG. 1. The system memory 904 may also be used to store data 916 needed or produced by the executable instructions. As a non-limiting example, the in-memory data 916 may include data associated with an RSS configuration, network interface driver settings, network traffic data, and/or network sensor processed data, etc., as discussed herein with reference to FIG. 1.

In some embodiments, some of the code 914 or executable instructions may be persistently stored on the computer system 900 and may have been loaded from external storage media. The persistent storage of the computer system 900 and the external media are examples of non-transitory computer-readable storage media, which may be used to store program instructions to be executed by the computer system 900. A non-transitory computer-readable storage medium may provide the capability to store information in a form readable by a machine (e.g., computer system 900). Non-transitory computer-readable media may include storage media such as magnetic or optical media, disk or DVD/CD-ROM devices, archival tapes, network-attached storage systems, or other computer systems.

In some embodiments, the I/O interface 906 may be configured to coordinate I/O traffic between processor 902, system memory 904 and any peripheral devices in the system, including through network interface 908 or other peripheral interfaces. In some embodiments, I/O interface 906 may perform any necessary protocol, timing, or other data transformations to convert data signals from one component (e.g., system memory 904) into a format suitable for use by another component (e.g., processor 902). In some embodiments, I/O interface 906 may include support for devices attached through various types of peripheral buses, such as a variant of the Peripheral Component Interconnect (PCI) bus standard or the Universal Serial Bus (USB) standard, for example. In some embodiments, the function of I/O interface 906 may be split into two or more separate components, such as a north bridge and a south bridge, for example. Also, in some embodiments, some or all of the functionality of I/O interface 906, such as an interface to system memory 904, may be incorporated directly into processor 902.

In some embodiments, the network interface 908 may allow data to be exchanged between computer system 900 and other devices attached to a network. The network interface 908 may also allow communication between computer system 900 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems.

Multiple input/output devices may be present in computer system 900 or may be distributed on various nodes of a distributed system that includes computer system 900. In some embodiments, similar input/output devices may be separate from computer system 900 and may interact with one or more nodes of a distributed system that includes computer system 900 through a wired or wireless connection, such as over network interface 908.

Network interface 908 may commonly support one or more wireless networking protocols (e.g., Wi-Fi/IEEE 802.11, or another wireless networking standard). In some embodiments, the network interface 908 may support communication via telecommunications/telephony networks such as analog voice networks or digital fiber communications networks, via storage area networks such as Fibre Channel SANs, or via any other suitable type of network and/or protocol.

In some implementations, advantages and features of the present disclosure may be further described by the following 20 statements.

1. A method comprising: determining, by a first security system processing first telemetry data associated with a first compute environment, first security alert data comprising a first one or more characteristics; determining, by the first security system processing the first telemetry data, first prioritization data associated with the first security alert data; determining, by a second security system processing second telemetry data associated with the first compute environment, second security alert data comprising a second one or more characteristics; determining, by the second security system processing the second telemetry data, second prioritization data associated with second security alert data; determining, based on the first security alert data and the second security alert data, third security alert data comprising the first one or more characteristics, the first prioritization data, the second one or more characteristics, and the second prioritization data; and initiating, based on determining the third security alert data, one or more remediation operations.

2. The method of claim 1, further comprising: determining, based on the first one or more characteristics, the first prioritization data, the second one or more characteristics, and the second prioritization data, one or more characteristics of a type of remediation operation; and determining, based on the type of remediation operation, the one or more remediation options.

3. The method of claim 1, further comprising: determining, based on third telemetry data associated with the first compute environment, a fourth security alert data; and determining a security alert group that comprises the third security alert data and the fourth security alert data.

4. The method of claim 3, wherein the determining the security alert group further comprises: determining that the third security alert data and the fourth security alert data have been determined within a threshold period of time; and determining that the third security alert data and the fourth security alert data are related to a same asset or to a same account.

5. The method of claim 1, wherein the determining the first security alert data further comprises determining that a first one or more detection rules match one or more characteristics of the first telemetry data, and wherein the determining the second security alert data further comprises determining that a second one or more detection rules match one or more characteristics of the second telemetry data.

6. The method of claim 5, wherein at least one of the first one or more detection rules is different from at least one of the second one or more detection rules.

7. The method of claim 1, wherein the third security alert data comprises a priority object indicative of a plurality of output results from a plurality of security systems, and wherein the plurality of output results comprises the first security alert data and the second security alert data.

8. A system comprising: a memory storing executable instructions; and one or more processors that execute the executable instructions to: determine, by a first security system processing first telemetry data associated with a first compute environment, first security alert data comprising a first one or more characteristics; determine, by the first security system processing the first telemetry data, first prioritization data associated with the first security alert data; determine, by a second security system processing second telemetry data associated with the first compute environment, second security alert data comprising a second one or more characteristics; determine, by the second security system processing the second telemetry data, second prioritization data associated with second security alert data; determine, based on the first security alert data and the second security alert data, third security alert data comprising the first one or more characteristics, the first prioritization data, the second one or more characteristics, and the second prioritization data; and initiate, based on determining the third security alert data, one or more remediation operations.

9. The system of claim 8, wherein the one or more processors further execute the executable instructions to: determine, based on the first one or more characteristics, the first prioritization data, the second one or more characteristics, and the second prioritization data, one or more characteristics of a type of remediation operation; and determine, based on the type of remediation operation, the one or more remediation options.

10. The system of claim 8, wherein the one or more processors further execute the executable instructions to: determine, based on third telemetry data associated with the first compute environment, a fourth security alert data; and determine a security alert group that comprises the third security alert data and the fourth security alert data.

11. The system of claim 10, wherein to determine the security alert group, the one or more processors further execute the executable instructions to: determine that the third security alert data and the fourth security alert data have been determined within a threshold period of time; and determine that the third security alert data and the fourth security alert data are related to a same asset or to a same account.

12. The system of claim 8, wherein the determining the first security alert data further comprises determining that a first one or more detection rules match one or more characteristics of the first telemetry data, and wherein the determining the second security alert data further comprises determining that a second one or more detection rules match one or more characteristics of the second telemetry data.

13. The system of claim 12, wherein at least one of the first one or more detection rules is different from at least one of the second one or more detection rules.

14. The system of claim 8, wherein the third security alert data comprises a priority object indicative of a plurality of output results from a plurality of security systems, and wherein the plurality of output results comprises the first security alert data and the second security alert data.

15. One or more non-transitory computer-accessible storage media storing executable instructions that, when executed by one or more processors, cause one or more computer systems to: determine, by a first security system processing first telemetry data associated with a first compute environment, first security alert data comprising a first one or more characteristics; determine, by the first security system processing the first telemetry data, first prioritization data associated with the first security alert data; determine, by a second security system processing second telemetry data associated with the first compute environment, second security alert data comprising a second one or more characteristics; determine, by the second security system processing the second telemetry data, second prioritization data associated with second security alert data; determine, based on the first security alert data and the second security alert data, third security alert data comprising the first one or more characteristics, the first prioritization data, the second one or more characteristics, and the second prioritization data; and initiate, based on determining the third security alert data, one or more remediation operations.

16. The one or more non-transitory computer-accessible storage media of claim 15, wherein the one or more processors, further cause one or more computer systems to: determine, based on the first one or more characteristics, the first prioritization data, the second one or more characteristics, and the second prioritization data, one or more characteristics of a type of remediation operation; and determine, based on the type of remediation operation, the one or more remediation options.

17. The one or more non-transitory computer-accessible storage media of claim 15, wherein the one or more processors, further cause one or more computer systems to: determine, based on third telemetry data associated with the first compute environment, a fourth security alert data; and determine a security alert group that comprises the third security alert data and the fourth security alert data.

18. The one or more non-transitory computer-accessible storage media of claim 17, wherein to determine the security alert group, the one or more processors further execute the executable instructions to: determine that the third security alert data and the fourth security alert data have been determined within a threshold period of time; and determine that the third security alert data and the fourth security alert data are related to a same asset or to a same account.

19. The one or more non-transitory computer-accessible storage media of claim 15, wherein the determining the first security alert data further comprises determining that a first one or more detection rules match one or more characteristics of the first telemetry data, and wherein the determining the second security alert data further comprises determining that a second one or more detection rules match one or more characteristics of the second telemetry data.

20. The one or more non-transitory computer-accessible storage media of claim 19, wherein the third security alert data comprises a priority object indicative of a plurality of output results from a plurality of security systems, and wherein the plurality of output results comprises the first security alert data and the second security alert data.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A method comprising:

determining, by a first security system processing first telemetry data associated with a first compute environment, first security alert data comprising a first one or more characteristics;

determining, by the first security system processing the first telemetry data, first prioritization data associated with the first security alert data;

determining, by a second security system processing second telemetry data associated with the first compute environment, second security alert data comprising a second one or more characteristics;

determining, by the second security system processing the second telemetry data, second prioritization data associated with second security alert data;

determining, based on the first security alert data and the second security alert data, third security alert data comprising the first one or more characteristics, the first prioritization data, the second one or more characteristics, and the second prioritization data;

initiating, based on determining the third security alert data, one or more remediation operations;

determining, based on third telemetry data associated with the first compute environment, a fourth security alert; and determining a security alert group that comprises the third security alert data and the fourth security alert data, wherein the determining the security alert group further comprises:

determining that the third security alert data and the fourth security alert data have been determined within a threshold period of time, and determining that the third security alert data and the fourth security alert data are related to a same asset or to a same account.

2. The method of claim 1, further comprising:

determining, based on the first one or more characteristics, the first prioritization data, the second one or more characteristics, and the second prioritization data, one or more characteristics of a type of remediation operation; and determining, based on the type of remediation operation, the one or more remediation options.

3. The method of claim 1, wherein the determining the first security alert data further comprises determining that a first one or more detection rules match one or more characteristics of the first telemetry data, and wherein the determining the second security alert data further comprises determining that a second one or more detection rules match one or more characteristics of the second telemetry data.

4. The method of claim 3, wherein at least one of the first one or more detection rules is different from at least one of the second one or more detection rules.

5. The method of claim 1, wherein the third security alert data comprises a priority object indicative of a plurality of output results from a plurality of security systems, and wherein the plurality of output results comprises the first security alert data and the second security alert data.

6. A system comprising:

a memory storing executable instructions; and one or more processors that execute the executable instructions to:

determine, by a first security system processing first telemetry data associated with a first compute environment, first security alert data comprising a first one or more characteristics;

determine, by the first security system processing the first telemetry data, first prioritization data associated with the first security alert data;

determine, by a second security system processing second telemetry data associated with the first compute environment, second security alert data comprising a second one or more characteristics;

determine, by the second security system processing the second telemetry data, second prioritization data associated with second security alert data;

determine, based on the first security alert data and the second security alert data, third security alert data comprising the first one or more characteristics, the first prioritization data, the second one or more characteristics, and the second prioritization data;

initiate, based on determining the third security alert data, one or more remediation operations;

determine, based on third telemetry data associated with the first compute environment, a fourth security alert; and determine a security alert group that comprises the third security alert data and the fourth security alert data, wherein the determining the security alert group further comprises:

determining that the third security alert data and the fourth security alert data have been determined within a threshold period of time, and determining that the third security alert data and the fourth security alert data are related to a same asset or to a same account.

7. The system of claim 6, wherein the one or more processors further execute the executable instructions to:

determine, based on the first one or more characteristics, the first prioritization data, the second one or more characteristics, and the second prioritization data, one or more characteristics of a type of remediation operation; and determine, based on the type of remediation operation, the one or more remediation options.

8. The system of claim 6, wherein the determining the first security alert data further comprises determining that a first one or more detection rules match one or more characteristics of the first telemetry data, and wherein the determining the second security alert data further comprises determining that a second one or more detection rules match one or more characteristics of the second telemetry data.

9. The system of claim 8, wherein at least one of the first one or more detection rules is different from at least one of the second one or more detection rules.

10. The system of claim 6, wherein the third security alert data comprises a priority object indicative of a plurality of output results from a plurality of security systems, and wherein the plurality of output results comprises the first security alert data and the second security alert data.

11. One or more non-transitory computer-accessible storage media storing executable instructions that, when executed by one or more processors, cause one or more computer systems to:

determine, by a first security system processing first telemetry data associated with a first compute environment, first security alert data comprising a first one or more characteristics;

determine, by the first security system processing the first telemetry data, first prioritization data associated with the first security alert data;

determine, by a second security system processing second telemetry data associated with the first compute environment, second security alert data comprising a second one or more characteristics;

determine, by the second security system processing the second telemetry data, second prioritization data associated with second security alert data;

determine, based on the first security alert data and the second security alert data, third security alert data comprising the first one or more characteristics, the first prioritization data, the second one or more characteristics, and the second prioritization data;

initiate, based on determining the third security alert data, one or more remediation operations;

determine, based on third telemetry data associated with the first compute environment, a fourth security alert; and determine a security alert group that comprises the third security alert data and the fourth security alert data, wherein the determining the security alert group further comprises:

determining that the third security alert data and the fourth security alert data have been determined within a threshold period of time, and determining that the third security alert data and the fourth security alert data are related to a same asset or to a same account.

12. The one or more non-transitory computer-accessible storage media of claim 11, wherein the one or more processors, further cause one or more computer systems to:

determine, based on the first one or more characteristics, the first prioritization data, the second one or more characteristics, and the second prioritization data, one or more characteristics of a type of remediation operation; and determine, based on the type of remediation operation, the one or more remediation options.

13. The one or more non-transitory computer-accessible storage media of claim 11, wherein the determining the first security alert data further comprises determining that a first one or more detection rules match one or more characteristics of the first telemetry data, and wherein the determining the second security alert data further comprises determining that a second one or more detection rules match one or more characteristics of the second telemetry data.

14. The one or more non-transitory computer-accessible storage media of claim 13, wherein the third security alert data comprises a priority object indicative of a plurality of output results from a plurality of security systems, and wherein the plurality of output results comprises the first security alert data and the second security alert data.

* * * * *